United States Patent
Si et al.

(10) Patent No.: US 12,389,235 B2
(45) Date of Patent: Aug. 12, 2025

(54) METHOD AND APPARATUS FOR FLEXIBLE STARTING LOCATIONS FOR SIDELINK TRANSMISSION

(71) Applicant: Samsung Electronics Co., Ltd., Suwon-si (KR)

(72) Inventors: Hongbo Si, Plano, TX (US); Emad N. Farag, Flanders, NJ (US); Carmela Cozzo, San Diego, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 419 days.

(21) Appl. No.: 18/058,700

(22) Filed: Nov. 23, 2022

(65) Prior Publication Data

US 2023/0180015 A1     Jun. 8, 2023

Related U.S. Application Data

(60) Provisional application No. 63/422,641, filed on Nov. 4, 2022, provisional application No. 63/396,802, filed (Continued)

(51) Int. Cl.
| | |
|---|---|
| *H04W 16/14* | (2009.01) |
| *H04W 74/08* | (2024.01) |
| *H04W 74/0808* | (2024.01) |

(52) U.S. Cl.
CPC ....... *H04W 16/14* (2013.01); *H04W 74/0808* (2013.01); *H04W 74/0866* (2013.01)

(58) Field of Classification Search
CPC ............. H04W 16/14; H04W 74/0808; H04W 74/0866

See application file for complete search history.

(56) References Cited

U.S. PATENT DOCUMENTS

| | | |
|---|---|---|
| 2019/0306923 A1 | 10/2019 | Xiong et al. |
| 2020/0351669 A1 | 11/2020 | Xu et al. |
| (Continued) | | |

FOREIGN PATENT DOCUMENTS

| | | | |
|---|---|---|---|
| CN | 113271670 A | 8/2021 | |
| WO | WO-2022198666 A1 * | 9/2022 | ........... H04L 1/0038 |

OTHER PUBLICATIONS

"3rd Generation Partnership Project; Technical Specification Group Radio Access Network; NR; Physical channels and modulation (Release 16)", 3GPP TS 38.211 V16.6.0, Jun. 2021, 134 pages.

(Continued)

*Primary Examiner* — Melvin C Marcelo

(57) ABSTRACT

Methods and apparatuses for use of flexible starting locations for SL transmissions in a wireless communication system. A method of user equipment (UE) in a wireless communication system operating with a shared spectrum channel access includes determining a set of multiple orthogonal frequency-division multiplexing (OFDM) symbols in a slot and performing a channel access procedure over a channel. The method further includes transmitting a sidelink transmission over the channel, starting from an OFDM symbol within the set of multiple OFDM symbols in the slot, upon successfully performing the channel access procedure before the OFDM symbol. The set of multiple OFDM symbols in the slot may be determined based on a higher layer configuration or pre-configurations.

20 Claims, 18 Drawing Sheets

Related U.S. Application Data on Aug. 10, 2022, provisional application No. 63/297,548, filed on Jan. 7, 2022, provisional application No. 63/292,833, filed on Dec. 22, 2021, provisional application No. 63/287,338, filed on Dec. 8, 2021.

(56) References Cited

U.S. PATENT DOCUMENTS

| | | |
|---|---|---|
| 2021/0314821 A1 | 10/2021 | Huang et al. |
| 2021/0368542 A1 | 11/2021 | Xue et al. |
| 2024/0015711 A1* | 1/2024 | Su .................. H04W 72/23 |

OTHER PUBLICATIONS

"3rd Generation Partnership Project; Technical Specification Group Radio Access Network; NR; Multiplexing and channel coding (Release 16)", 3GPP TS 38.212 V16.6.0, Jun. 2021, 153 pages.

"3rd Generation Partnership Project; Technical Specification Group Radio Access Network; NR; Physical layer procedures for control (Release 16)", 3GPP TS 38.213 V16.6.0, Jun. 2021, 187 pages.

"3rd Generation Partnership Project; Technical Specification Group Radio Access Network; NR; Physical layer procedures for data (Release 16)", 3GPP TS 38.214 V16.6.0, Jun. 2021, 172 pages.

"3rd Generation Partnership Project; Technical Specification Group Radio Access Network; NR; Medium Access Control (MAC) protocol specification (Release 16)", 3GPP TS 38.321 V16.6.0, Sep. 2021, 158 pages.

"3rd Generation Partnership Project; Technical Specification Group Radio Access Network; NR; Radio Resource Control (RRC) protocol specification (Release 16)", 3GPP TS 38.331 V16.5.0, Jun. 2021, 964 pages.

International Search Report and Written Opinion issued Mar. 20, 2023 regarding International Application No. PCT/KR2022/019949, 6 pages.

RAN1 Chair (Samsung), "New WID on further enhancements for NR sidelink", 3GPP TSG RAN Meeting #94e, RP-212704, Nov. 2021, 5 pages.

Extended European Search Report issued Feb. 28, 2025 regarding Application No. 22904692.5, 10 pages.

CMCC, "Remaining issues on physical layer structure for sidelink", 3GPP TSG RAN WG1 #100bis, R1-2002204, Apr. 2020, 5 pages.

Sharp, "Remaining issues on physical layer structure for NR sidelink", 3GPP TSG RAN WG1 Meeting #100-e, R1-2000876, Feb. 2020, 6 pages.

Moderator (Samsung), "FL summary for thread 2 on Maintenance for 5G V2X with NR sidelink", 3GPP TSG RAN WG1 #102-e Meeting, R1-2009845, Aug. 2020, 37 pages.

* cited by examiner

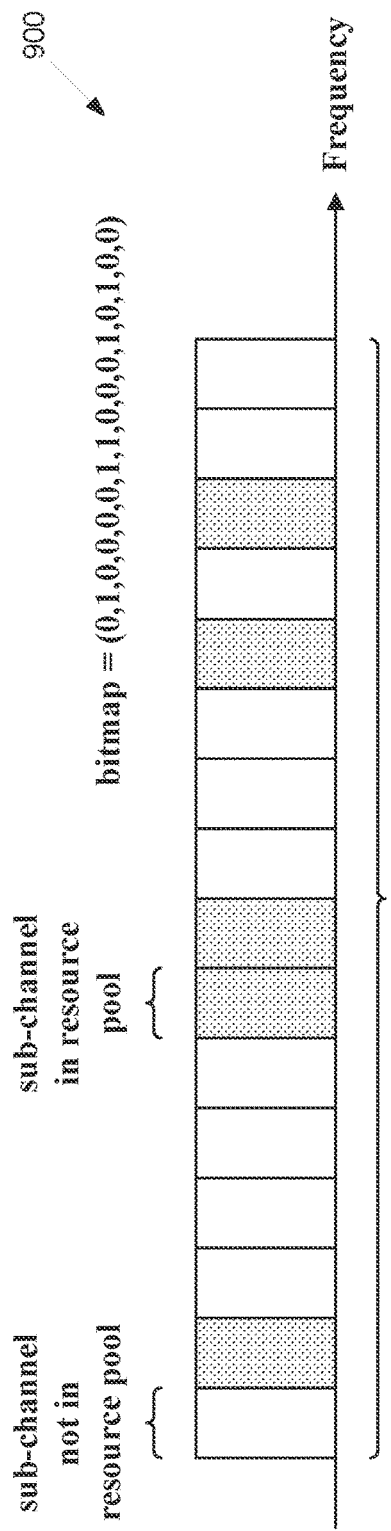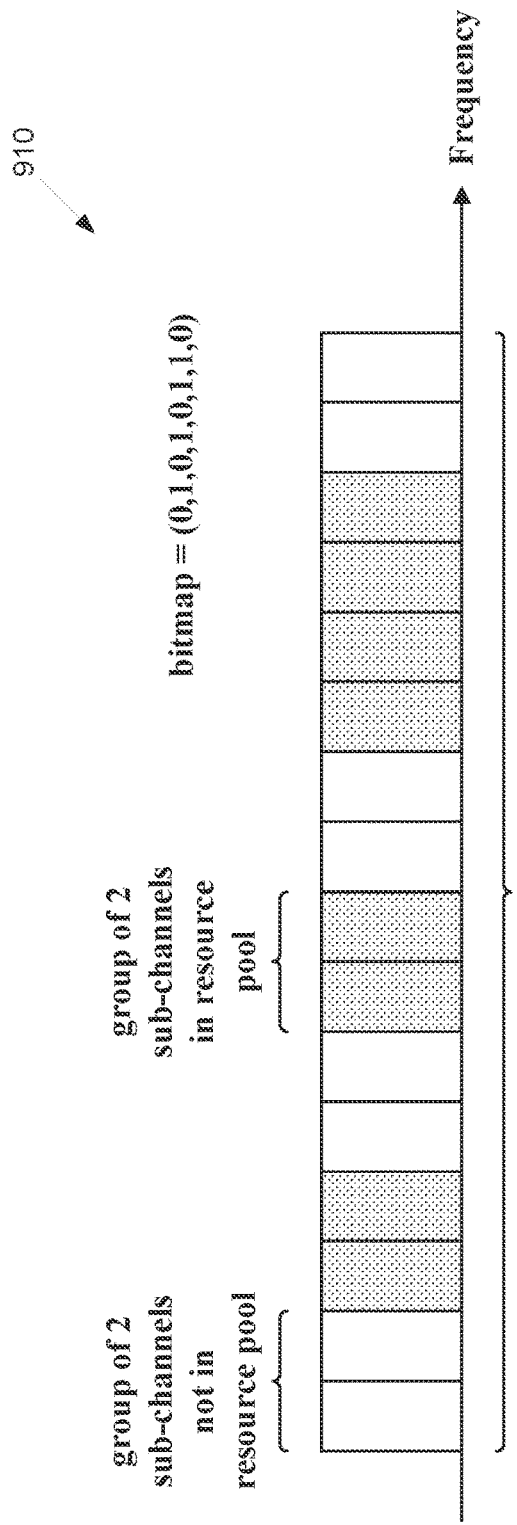
FIG. 9A
FIG. 9B

METHOD AND APPARATUS FOR FLEXIBLE STARTING LOCATIONS FOR SIDELINK TRANSMISSION

CROSS-REFERENCE TO RELATED APPLICATIONS AND CLAIM OF PRIORITY

The present application claims priority to:
U.S. Provisional Patent Application No. 63/287,338, filed on Dec. 8, 2021;
U.S. Provisional Patent Application No. 63/292,833, filed on Dec. 22, 2021;
U.S. Provisional Patent Application No. 63/297,548, filed on Jan. 7, 2022;
U.S. Provisional Patent Application No. 63/396,802, filed on Aug. 10, 2022; and
U.S. Provisional Patent Application No. 63/422,641, filed on Nov. 4, 2022. The content of the above-identified patent documents are incorporated herein by reference.

TECHNICAL FIELD

The present disclosure relates generally to wireless communication systems and, more specifically, the present disclosure relates to flexible starting locations for sidelink (SL) transmissions and a non-contiguous sub-channel based resource pool in a wireless communication system.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to flexible starting locations for SL transmissions and a non-contiguous sub-channel based resource pool in a wireless communication system.

In one embodiment, a user equipment (UE) in a wireless communication system operating with a shared spectrum channel access is provided. The UE includes a processor configured to determine a set of multiple orthogonal frequency-division multiplexing (OFDM) symbols in a slot and perform a channel access procedure over a channel. The UE further includes a transceiver operably coupled to the processor. The transceiver is configured to transmit a sidelink transmission over the channel, starting from an OFDM symbol within the set of multiple OFDM symbols in the slot, upon successfully performing the channel access procedure before the OFDM symbol.

In another embodiment, a method of UE in a wireless communication system operating with a shared spectrum channel access is provided. The method includes determining a set of multiple OFDM symbols in a slot and performing a channel access procedure over a channel. The method further includes transmitting a sidelink transmission over the channel, starting from an OFDM symbol within the set of multiple OFDM symbols in the slot, upon successfully performing the channel access procedure before the OFDM symbol.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates an example of non-contiguous sub-channel based resource pool according to embodiments of the present disclosure;

FIG. 9B illustrates another example of non-contiguous sub-channel based resource pool according to embodiments of the present disclosure;

DETAILED DESCRIPTION

FIGS. 1 through 16, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v16.6.0, "NR, Physical channels and modulation"; 3GPP TS 38.212 v16.6.0, "NR, Multiplexing and Channel coding"; 3GPP TS 38.213 v16.6.0, "NR, Physical Layer Procedures for Control"; 3GPP TS 38.214 v16.6.0"; 3GPP TS 38.321 v16.6.0, "NR, Medium Access Control (MAC) protocol specification"; and 3GPP TS 38.331 v16.5.0, "NR, Radio Resource Control (RRC) Protocol Specification."

Figure 1:
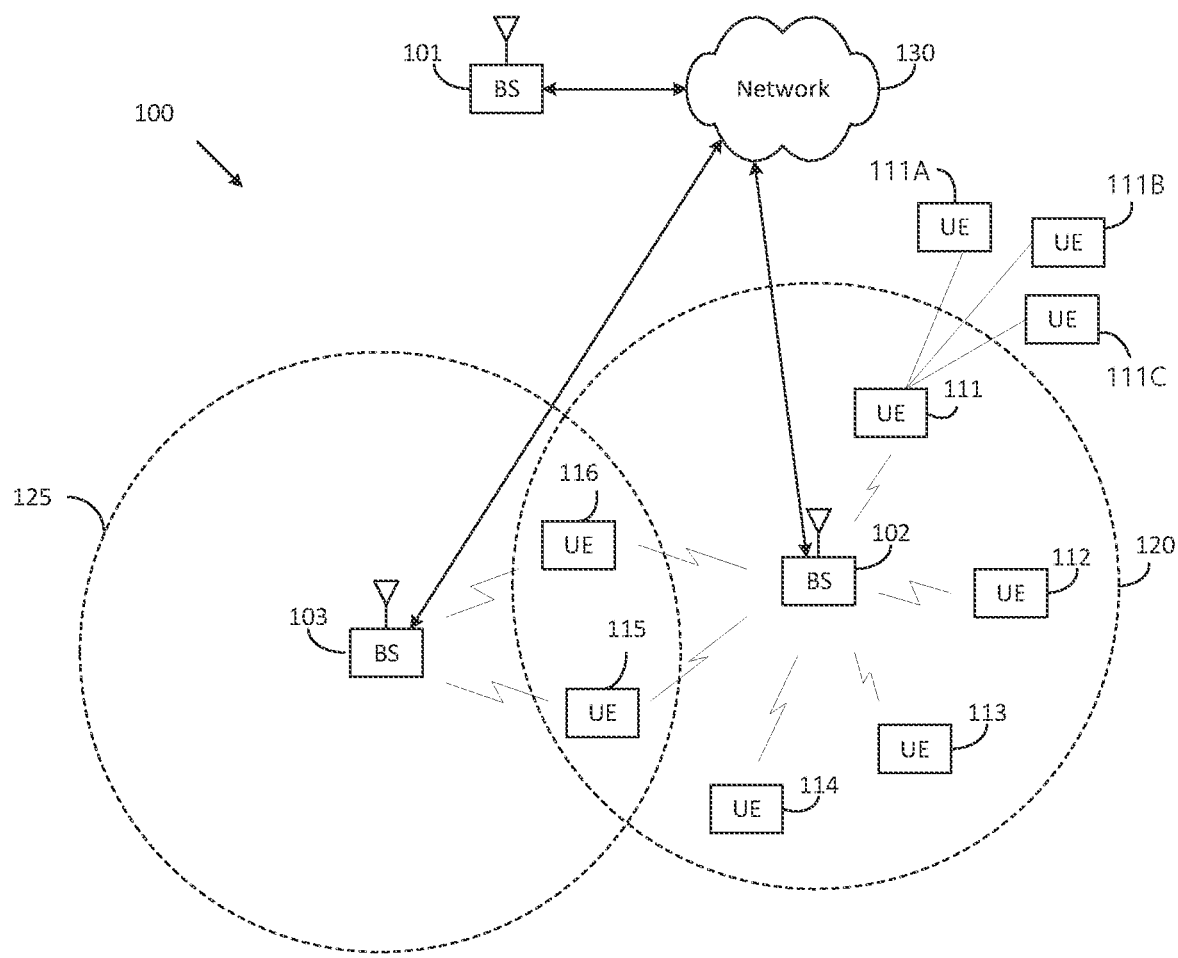
FIG. 1 illustrates an example of wireless network according to embodiments of the present disclosure.
Figure 2:
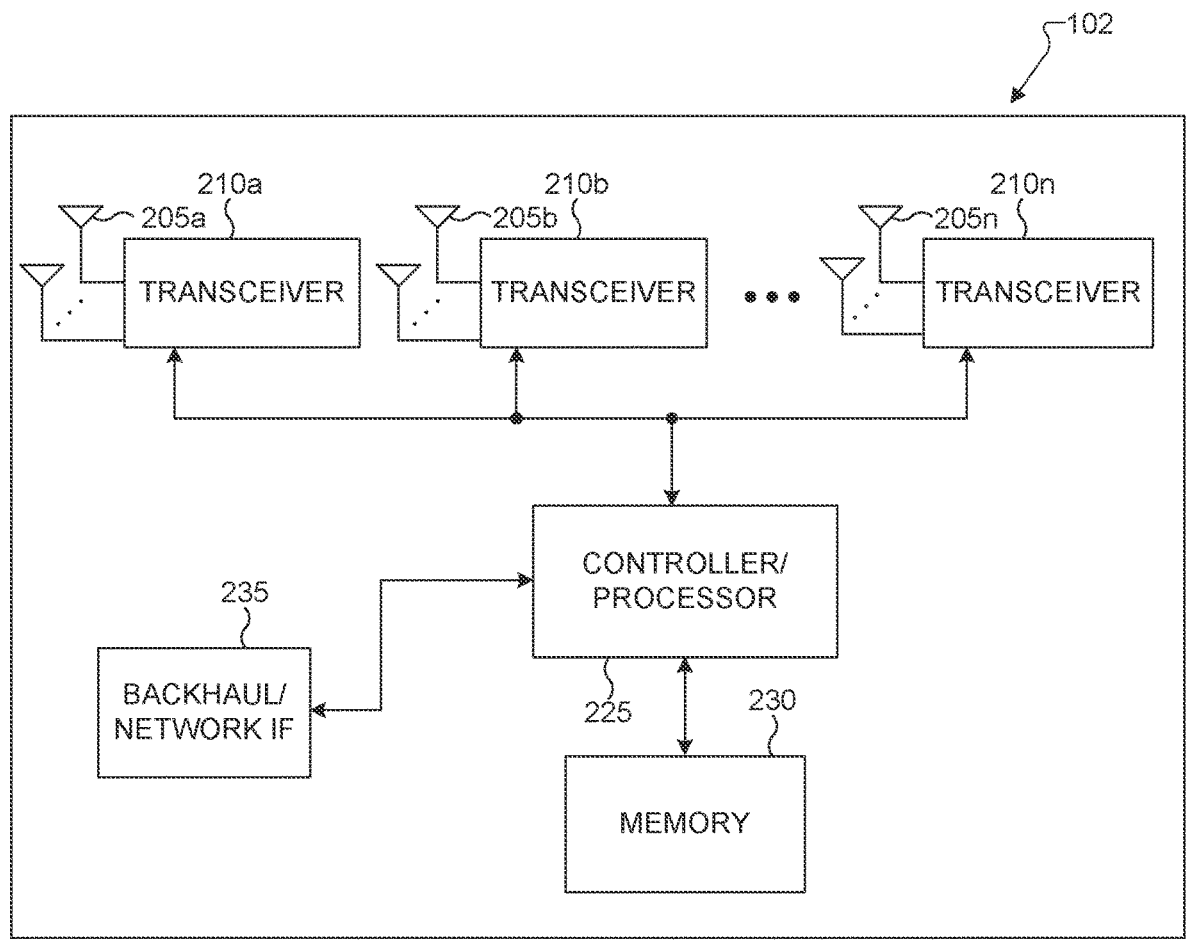
FIG. 2 illustrates an example of gNB according to embodiments of the present disclosure.
Figure 3:
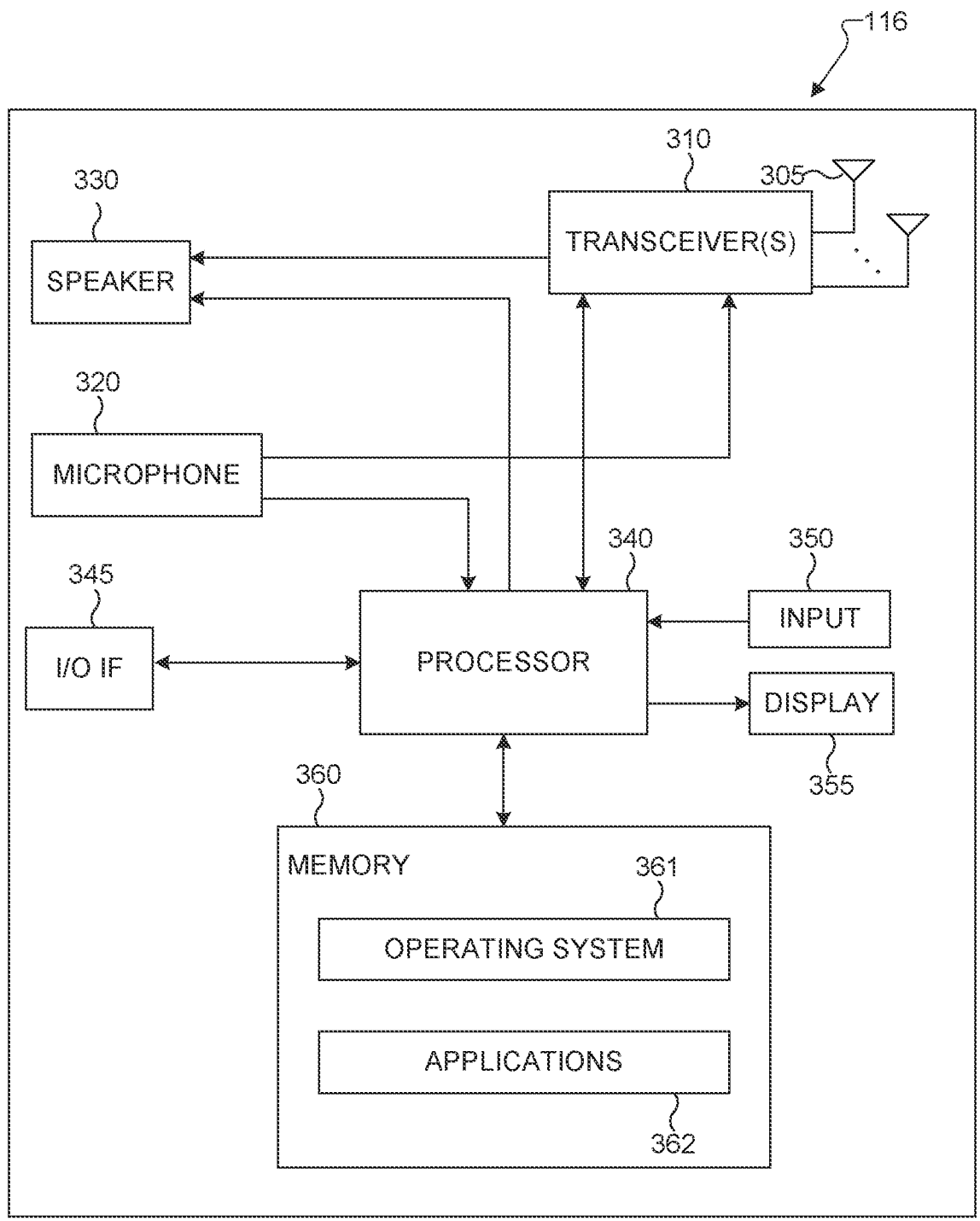
FIG. 3 illustrates an example of UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNB s 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for utilization of flexible starting locations for SL transmissions and a non-contiguous sub-channel based resource pool and/or a flexible starting location for SL transmissions. In certain embodiments, and one or more of the gNBs 101-103 includes circuitry, programing, or a combination thereof, for assisting with flexible starting locations for SL transmissions and a non-contiguous sub-channel based resource pool and/or a flexible starting location for SL transmissions.

As discussed in greater detail below, the wireless network 100 may have communications facilitated via one or more devices (e.g., UEs 111A to 111C) that may have a SL communication with the UE 111. The UE 111 can communicate directly with the UEs 111A to 111C through a set of SLs (e.g., SL interfaces) to provide sideline communication, for example, in situations where the UE 111A to 111C are remotely located or otherwise in need of facilitation for network access connections (e.g., BS 102) beyond or in addition to traditional fronthaul and/or backhaul connections/interfaces. In one example, the UE 111 can have direct communication, through the SL communication, with UE 111A to 111C with or without support by the BS 102. Various of the UEs (e.g., as depicted by UEs 112 to 116) may be capable of one or more communication with their other UEs (such as UEs 111A to 111C as for UE 111).

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple transceivers 210a-210n, a controller/processor 225, a memory 230, and a backhaul or network interface 235.

The transceivers 210a-210n receive, from the antennas 205a-205n, incoming RF signals, such as signals transmitted by UEs in the network 100. The transceivers 210a-210n down-convert the incoming RF signals to generate IF or baseband signals. The IF or baseband signals are processed by receive (RX) processing circuitry in the transceivers 210a-210n and/or controller/processor 225, which generates processed baseband signals by filtering, decoding, and/or digitizing the baseband or IF signals. The controller/processor 225 may further process the baseband signals.

Transmit (TX) processing circuitry in the transceivers 210a-210n and/or controller/processor 225 receives analog or digital data (such as voice data, web data, e-mail, or interactive video game data) from the controller/processor 225. The TX processing circuitry encodes, multiplexes, and/or digitizes the outgoing baseband data to generate processed baseband or IF signals. The transceivers 210a-210n up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of UL channel signals and the transmission of DL channel signals by the transceivers 210a-210n in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support flexible starting locations for SL transmissions and a non-contiguous sub-channel based resource pool in a wireless communication system. Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes antenna(s) 305, a transceiver(s) 310, and a microphone 320. The UE 116 also includes a speaker 330, a processor 340, an input/output (I/O) interface (IF) 345, an input 350, a display 355, and a memory 360. The memory 360 includes an operating system (OS) 361 and one or more applications 362.

The transceiver(s) 310 receives, from the antenna 305, an incoming RF signal transmitted by a gNB of the network 100. The transceiver(s) 310 down-converts the incoming RF signal to generate an intermediate frequency (IF) or baseband signal. The IF or baseband signal is processed by RX processing circuitry in the transceiver(s) 310 and/or processor 340, which generates a processed baseband signal by filtering, decoding, and/or digitizing the baseband or IF signal. The RX processing circuitry sends the processed baseband signal to the speaker 330 (such as for voice data) or is processed by the processor 340 (such as for web browsing data).

TX processing circuitry in the transceiver(s) 310 and/or processor 340 receives analog or digital voice data from the microphone 320 or other outgoing baseband data (such as web data, e-mail, or interactive video game data) from the processor 340. The TX processing circuitry encodes, multiplexes, and/or digitizes the outgoing baseband data to generate a processed baseband or IF signal. The transceiver(s) 310 up-converts the baseband or IF signal to an RF signal that is transmitted via the antenna(s) 305.

The processor 340 can include one or more processors or other processing devices and execute the OS 361 stored in the memory 360 in order to control the overall operation of the UE 116. For example, the processor 340 could control the reception of DL channel signals and the transmission of UL channel signals by the transceiver(s) 310 in accordance with well-known principles. In various embodiments, the processor 340 supports utilization of flexible starting locations for SL transmissions and a non-contiguous sub-channel based resource pool and/or a flexible starting location for SL transmissions. In some embodiments, the processor 340 includes at least one microprocessor or microcontroller.

The processor 340 is also capable of executing other processes and programs resident in the memory 360. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input 350, which includes for example, a touchscreen, keypad, etc., and the display 355. The operator of the UE 116 can use the input 350 to enter data into the UE 116. The display 355 may be a liquid crystal display, light emitting diode display, or other display capable of rendering text and/or at least limited graphics, such as from web sites.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
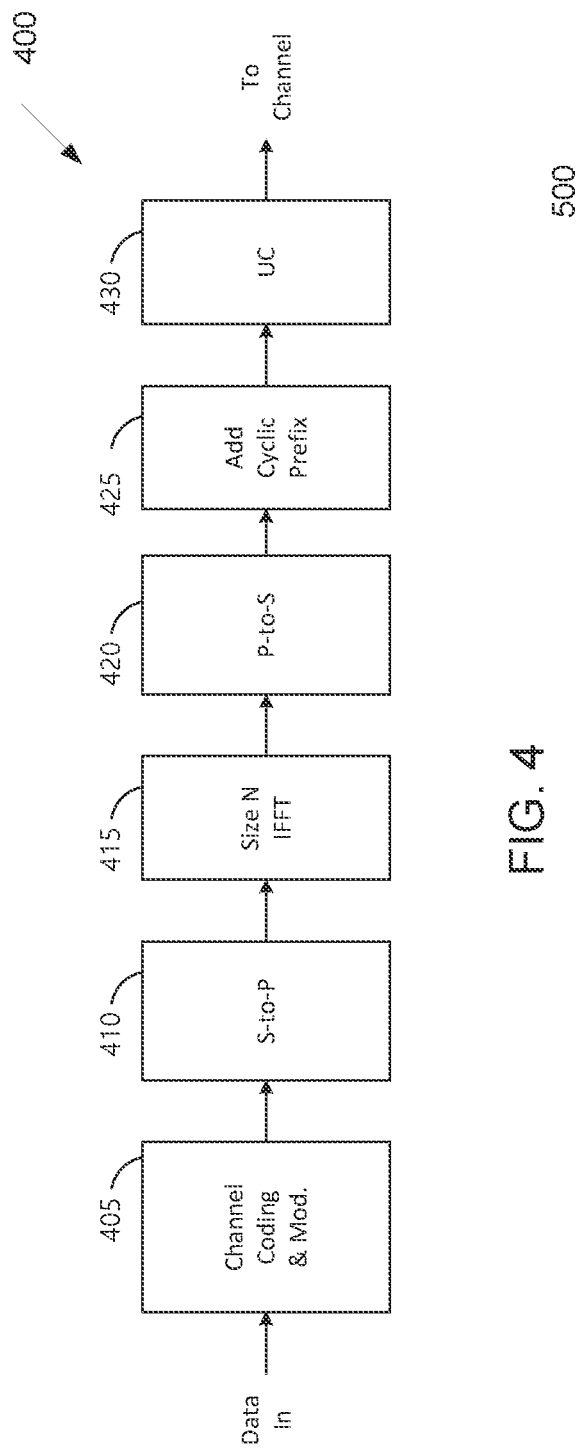
FIGS. 4 and 5 illustrate example of wireless transmit and receive paths according to this disclosure.
Figure 5:
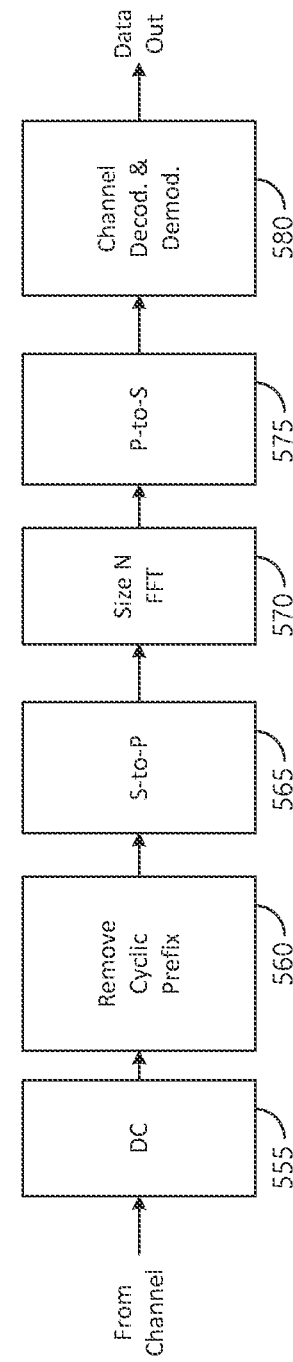

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

Rel.14 LTE and Rel.15 NR support up to 32 CSI-RS antenna ports which enable an eNB to be equipped with a large number of antenna elements (such as 64 or 128). In this case, a plurality of antenna elements is mapped onto one CSI-RS port. For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated in FIG. 6.

Figure 6:
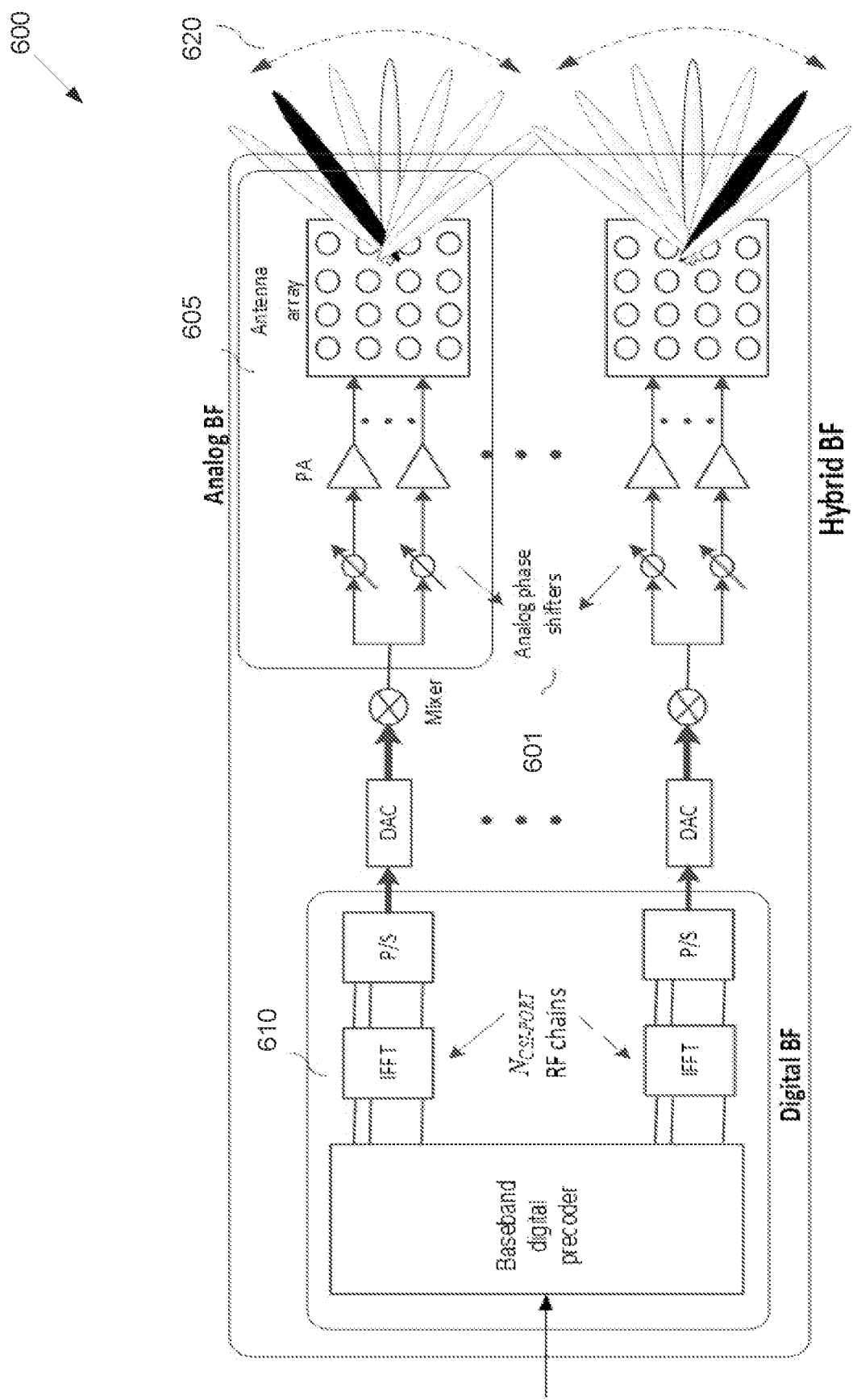
FIG. 6 illustrates an example of antenna structure according to embodiments of the present disclosure.

FIG. 6 illustrates an example antenna structure 600 according to embodiments of the present disclosure. An embodiment of the antenna structure 600 shown in FIG. 6 is for illustration only.

In this case, one CSI-RS port is mapped onto a large number of antenna elements which can be controlled by a bank of analog phase shifters 601. One CSI-RS port can then correspond to one sub-array which produces a narrow analog beam through analog beamforming 605. This analog beam can be configured to sweep across a wider range of angles 620 by varying the phase shifter bank across symbols or subframes. The number of sub-arrays (equal to the number of RF chains) is the same as the number of CSI-RS ports $N_{CSI\text{-}PORT}$. A digital beamforming unit 610 performs a linear combination across $N_{CSI\text{-}PORT}$ analog beams to further increase precoding gain. While analog beams are wideband (hence not frequency-selective), digital precoding can be varied across frequency sub-bands or resource blocks. Receiver operation can be conceived analogously.

Since the aforementioned system utilizes multiple analog beams for transmission and reception (wherein one or a small number of analog beams are selected out of a large number, for instance, after a training duration—to be performed from time to time), the term "multi-beam operation" is used to refer to the overall system aspect. This includes, for the purpose of illustration, indicating the assigned DL or UL TX beam (also termed "beam indication"), measuring at least one reference signal for calculating and performing beam reporting (also termed "beam measurement" and "beam reporting," respectively), and receiving a DL or UL transmission via a selection of a corresponding RX beam.

The aforementioned system is also applicable to higher frequency bands such as >52.6 GHz. In this case, the system can employ only analog beams. Due to the $O_2$ absorption loss around 60 GHz frequency (~10 dB additional loss @100 m distance), larger number of and sharper analog beams (hence larger number of radiators in the array) may be needed to compensate for the additional path loss.

In Rel-16 NR V2X, transmission and reception of SL signals and channels are based on resource pool(s) confined in the configured SL bandwidth part (BWP). In the frequency domain, a resource pool consists of a (pre-)configured number (e.g., sl-NumSubchannel) of contiguous sub-channels, wherein each sub-channel consists of a set of contiguous resource blocks (RBs) in a slot with size (pre-)configured by higher layer parameter (e.g., sl-Subchannel-Size). In a time domain, slots in a resource pool occur with a periodicity of 10,240 ms, and slots including S-SSB, non-UL slots, and reserved slots are not applicable for a resource pool. The set of slots for a resource pool is further determined within the remaining slots, based on a (pre-)configured bitmap (e.g., sl-TimeResource). An illustration of a resource pool is shown in FIG. 7.

Figure 7:
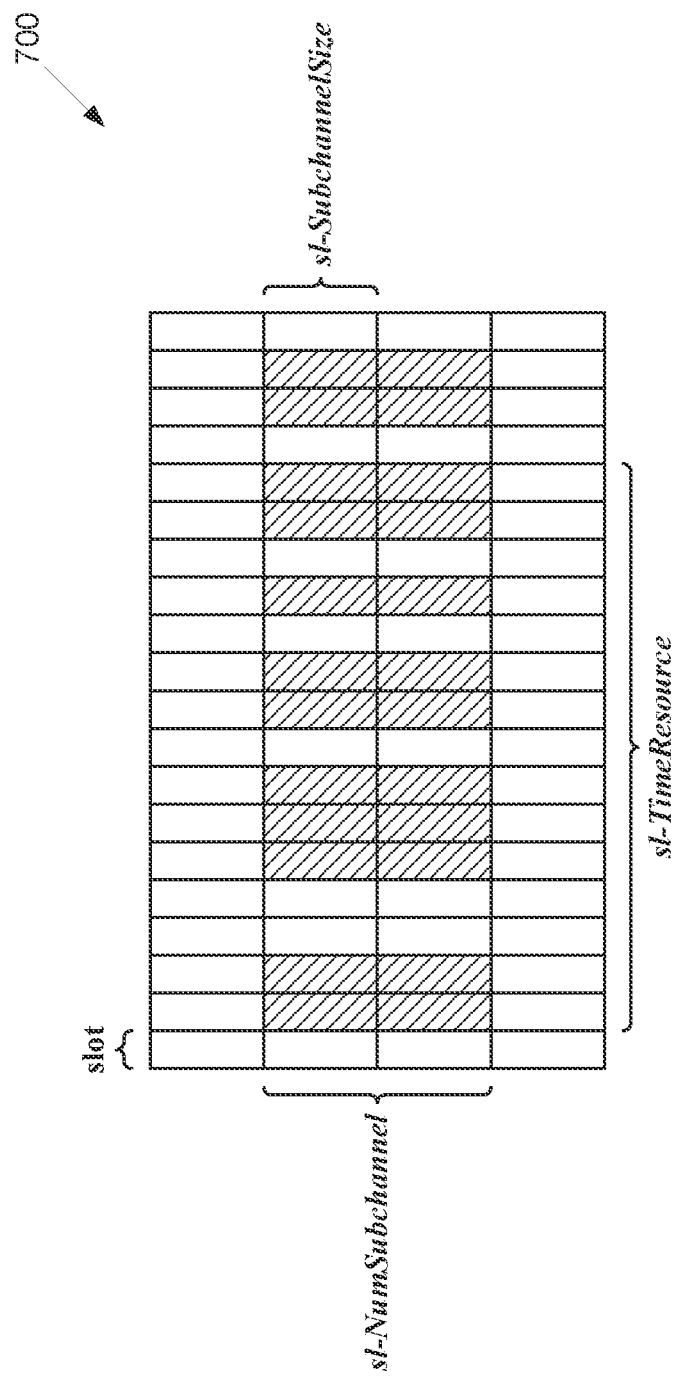
FIG. 7 illustrates an example of resource pool in Rel-16 NR V2X according to embodiments of the present disclosure.

FIG. 7 illustrates an example of resource pool 700 in Rel-16 NR V2X according to embodiments of the present disclosure. An embodiment of the of resource pool 700 shown in FIG. 7 is for illustration only.

A transmission and reception of physical sidelink shared channel (PSSCH), a physical sidelink control channel (PSCCH), and a physical sidelink feedback channel (PSFCH) are confined within and associated with a resource pool, with parameters (pre-)configured by higher layers (e.g., SL-PSSCH-Config, SL-PSCCH-Config, and SL-PSFCH-Config, respectively).

A UE may transmit the PSSCH in consecutive symbols within a slot of the resource pool, and PSSCH resource allocation starts from the second symbol configured for sidelink, e.g., startSLsymbol+1, and the first symbol configured for sidelink is duplicated from the second configured for sidelink, for AGC purpose. The UE may not transmit PSCCH in symbols not configured for sidelink, or in symbols configured for PSFCH, or in the last symbol configured for sidelink, or in the symbol immediately preceding the PSFCH. The frequency domain resource allocation unit for PSSCH is the sub-channel, and the sub-channel assignment is determined using the corresponding field in the associated SCI.

For transmitting a PSCCH, the UE can be provided a number of symbols (either 2 symbols or 3 symbols) in a resource pool (e.g., sl-TimResourcePSCCH) starting from the second symbol configured for sidelink, e.g., startSLsymbol+1; and further provided a number of RBs in the resource pool (e.g., sl-FreqResourcePSCCH) starting from the lowest RB of the lowest sub-channel of the associated PSSCH.

The UE can be further provided a number of slots (e.g., sl-PSFCH-Period) in the resource pool for a period of PSFCH transmission occasion resources, and a slot in the resource pool is determined as containing a PSFCH transmission occasion if the relative slot index within the resource pool is an integer multiple of the period of PSFCH transmission occasion. PSFCH is transmitted in two contiguous symbols in a slot, wherein the second symbol is with index startSLsymbols+lengthSLsymbols−2, and the two symbols are repeated. In frequency domain, PSFCH is transmitted in a single RB, wherein OCC can be possibly applied within the RB for multiplexing, and the location of the RB is determined based on an indication of a bitmap (e.g., sl-PSFCH-RB-Set), and the selection of PSFCH resource is according to the source ID and destination ID.

The first symbol including PSSCH and PSCCH is duplicated for AGC purpose. An illustration of the slot structure including PSSCH and PSCCH is shown in 801 of FIG. 8, and the slot structure including PSSCH, PSCCH and PSFCH is shown in 802 of FIG. 8.

Figure 8:
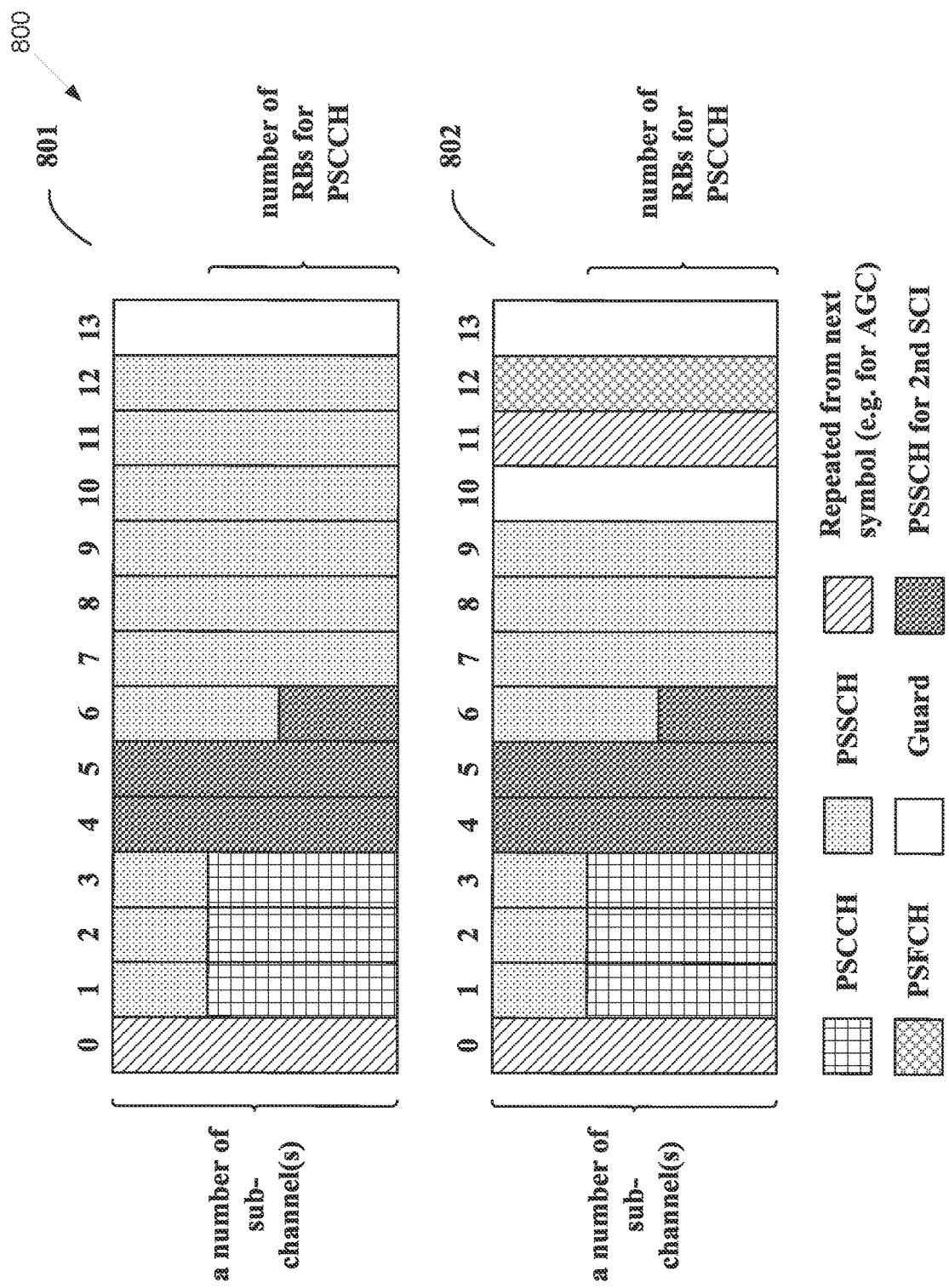
FIG. 8 illustrates an example of slot structure for SL transmission and reception according to embodiments of the present disclosure.

FIG. 8 illustrates an example of slot structure 800 for SL transmission and reception according to embodiments of the present disclosure. An embodiment of the slot structure 800 shown in FIG. 8 is for illustration only.

For a sidelink operation on an unlicensed or shared spectrum, there is a need to support enhancement to resource allocation such that the occupied channel bandwidth (OCB) and power spectral density (PSD) requirement can be satisfied according to the regulation of the unlicensed spectrum. In particular, there is a need to support non-contiguous resource allocation, wherein the resource pool can include non-contiguous sub-channels, and the associated resource allocation for PSSCH, PSCCH, and PSFCH within the resource pool.

The present disclosure provides embodiments for supporting resource pool with contiguous or non-contiguous sub-channels, with its application at least to but not restricted to operation with shared spectrum channel access.

The present disclosure provides embodiments for supporting resource pool with contiguous or non-contiguous sub-channels, with its application at least to but not restricted to operation with shared spectrum channel access. In the present disclosure, following are provided: (1) interlace based sub-channel; (2) non-contiguous sub-channel based resource pool; (3) indication of the enabling of non-contiguous sub-channel based resource pool; (4) frequency domain resource allocation for PSSCH; (5) frequency domain resource allocation for PSCCH; and (6) frequency domain resource allocation for PSFCH.

In one embodiment, a resource pool can consist of a (pre-)configured set of sub-channels within a SL bandwidth part (BWP), wherein the set of sub-channels can be either contiguous or non-contiguous in the frequency domain.

In one approach, the set of sub-channels in a resource pool can be (pre-)configured by higher layer parameter(s).

FIG. 9A illustrates an example of non-contiguous sub-channel based resource pool 900 according to embodiments of the present disclosure. An embodiment of the non-contiguous sub-channel based resource pool 900 shown in FIG. 9A is for illustration only.

For one example, the higher layer parameter can be a bitmap. An illustration of this example is shown in FIG. 9A.

In one example, the length of the bitmap can be determined by $\lfloor N_{RB}^{BWP}/N_{RB}^{subchannel} \rfloor$, where $N_{RB}^{BWP}$ is the number of RBs in the SL BWP, and $N_{RB}^{subchannel}$ is the number of RBs in a sub-channel. In one instance, if $N_{RB}^{BWP} > N_{RB}^{subchannel} \cdot \lfloor N_{RB}^{BWP}/N_{RB}^{subchannel} \rfloor$, the remaining number of RB(s) are used for sub-channels.

In another example, it may be assumed that each sub-channel in the resource pool has the same number of RBs, e.g., $N_{RB}^{subchannel}$ can be fixed or provided by a higher layer parameter. For one sub-example, $N_{RB}^{subchannel}$ can be fixed as 1 (in this sub-example, a sub-channel is same as an RB).

In yet another example, a bit taking value of 1 in the bitmap indicates the corresponding sub-channel is included in the resource pool, and the bit taking value of 0 in the bitmap indicates the corresponding sub-channel is not included in the resource pool.

In yet another example, the number of sub-channels included in the resource pool (e.g., $N_{subchannel}^{SL}$) can be determined as the number of bits taking value of 1 in the bitmap.

In yet another, there can be a restriction on the bitmap such that the indicated sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the bitmap such that the indicated sub-channels included in the resource pool satisfy the PSD requirement according to the regulation for operation with shared spectrum channel access when applicable. For one sub-example, there can be a restriction that the number of consecutive bits taking value of 0 in the bitmap cannot exceed or is smaller than a predefined threshold number.

FIG. 9B illustrates another example of non-contiguous sub-channel based resource pool 910 according to embodiments of the present disclosure. An embodiment of the non-contiguous sub-channel based resource pool 910 shown in FIG. 9B is for illustration only.

For another example, the higher layer parameter can be a bitmap. An illustration of this example is shown in FIG. 9B.

In one example, the length of the bitmap can be determined by $\lfloor N_{RB}^{BWP}/(N_{RB}^{subchannel} \cdot N_{subchannel}^{group}) \rfloor$, where $N_{RB}^{BWP}$ is the number of RBs in the SL BWP, $N_{RB}^{subchannel}$ is the number of RBs in a sub-channel, and $N_{subchannel}^{group}$ is a number of sub channels in a group of contiguous sub-channels.

In another example, it may be assumed that each sub-channel in the resource pool has the same number of RBs, e.g., $N_{RB}^{subchannel}$ can be fixed or provided by a higher layer parameter. For one sub-example, $N_{RB}^{subchannel}$ can be fixed as 1 (in this sub-example, a sub-channel is same as an RB).

In yet another example, $N_{subchannel}^{group}$ can be fixed or provided by a higher layer parameter. For one sub-example, $N_{subchannel}^{group}$ can be fixed as 1 (in this sub-example, a sub-channel group is same as a sub-channel). For another sub-example, $N_{subchannel}^{group}$ can be fixed as $N_{subchannel}^{group}=5$ or $N_{subchannel}^{group}=10$.

In yet another example, a bit taking value of 1 in the bitmap indicates the corresponding group of consecutive sub-channels is included in the resource pool, and the bit taking value of 0 in the bitmap indicates the corresponding group of consecutive sub-channels is not included in the resource pool.

In yet another example, the number of sub-channels included in the resource pool (e.g., $N_{subchannel}^{SL}$) can be determined as $N_{subchannel}^{group}$ times the number of bits taking value of 1 in the bitmap.

In yet another example, there can be a restriction on the bitmap such that the indicated sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the bitmap such that the indicated sub-channels included in the resource pool satisfy the PSD requirement according to the regulation for operation with shared spectrum channel access when applicable. For one sub-example, there can be a restriction that the number of consecutive bits taking value of 0 in the bitmap cannot exceed or is smaller than a predefined threshold number.

Figure 9C:
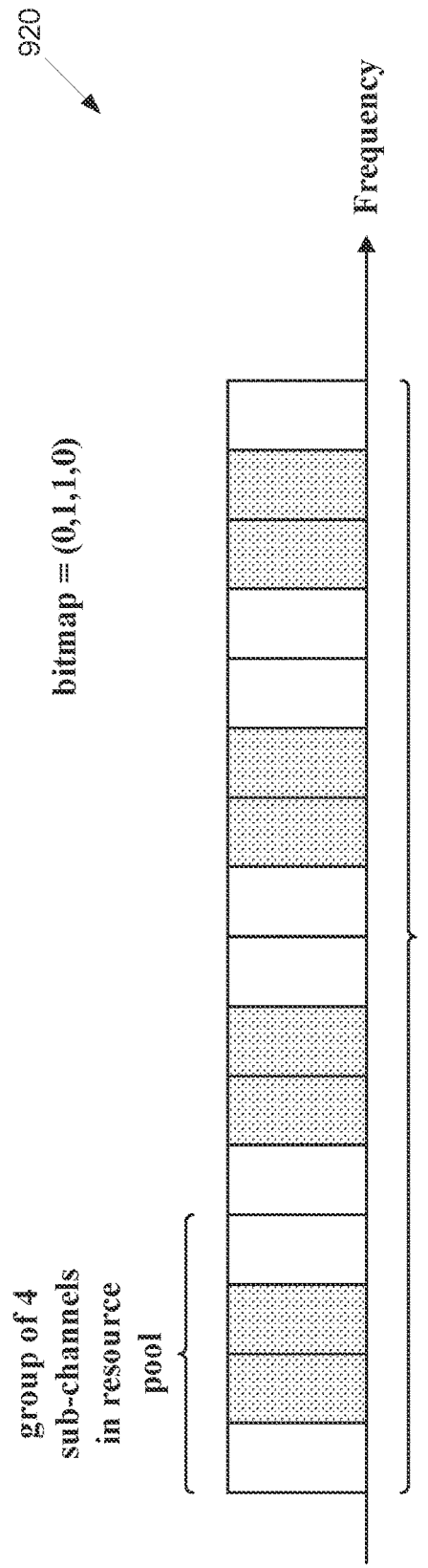
FIG. 9C illustrates yet another example of non-contiguous sub-channel based resource pool according to embodiments of the present disclosure.

FIG. 9C illustrates yet another example of non-contiguous sub-channel based resource pool 920 according to embodiments of the present disclosure. An embodiment of the non-contiguous sub-channel based resource pool 920 shown in FIG. 9C is for illustration only.

For yet another example, the higher layer parameter can be a bitmap. An illustration of this example is shown in FIG. 9C.

In one example, the length of the bitmap can be determined by $N_{subchannel}^{group}$, where $N_{subchannel}^{group}$ is a number of sub-channels in a group of contiguous sub-channels.

In another example, a bit taking value of 1 indicates the corresponding sub-channels in all the sub-channel groups are included in the resource pool, and a bit taking value of 0 indicates the corresponding sub-channels in all the sub-channel groups are not included in the resource pool.

In yet another example, the pattern of including sub-channels in the resource pool is repeated every $N_{subchannel}^{group}$ sub-channels. The number of repetitions of the pattern (e.g., a number of sub-channel groups in the BWP) can be determined as $\lfloor N_{RB}^{BWP}/(N_{RB}^{subchannel} \cdot N_{subchannel}^{group}) \rfloor$.

In yet another example, it's assumed that each sub-channel in the resource pool has the same number of RBs, e.g., $N_{RB}^{subchannel}$ can be fixed or provided by a higher layer parameter. For one sub-example, $N_{RB}^{subchannel}$ can be fixed as 1 (in this sub-example, a sub-channel is same as an RB).

In yet another example, $N_{subchannel}^{group}$ can be fixed in the specification or provided by a higher layer parameter. For one sub-example, $N_{subchannel}^{group}$ can be fixed as 1 (in this sub-example, a sub-channel group is same as a sub-channel). For another sub-example, $N_{subchannel}^{group}$ can be fixed as $N_{subchannel}^{group}=5$ or $N_{subchannel}^{group}=10$.

In yet another example, the number of sub-channels included in the resource pool (e.g., $N_{subchannel}^{SL}$) can be determined as the product of the number of bits taking value of 1 in the bitmap and the number of sub-channel groups in the BWP.

In yet another example, there can be a restriction on the bitmap such that the indicated sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the bitmap such that the indicated sub-channels included in the resource pool satisfy the PSD requirement according to the regulation for operation with shared spectrum channel access when applicable. For one sub-example, there can be a restriction that the number of consecutive bits taking value of 0 in bitmap cannot exceed or is smaller than a predefined threshold number.

Figure 9D:
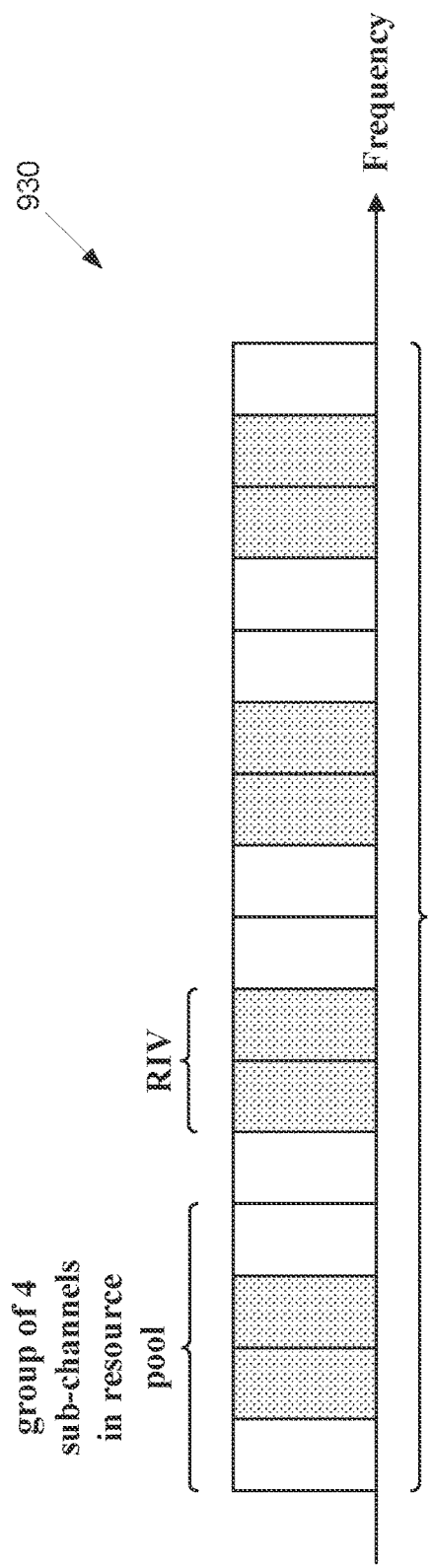
FIG. 9D illustrates yet another example of non-contiguous sub-channel based resource pool according to embodiments of the present disclosure.

FIG. 9D illustrates yet another example of non-contiguous sub-channel based resource pool 930 according to embodiments of the present disclosure. An embodiment of the non-contiguous sub-channel based resource pool 930 shown in FIG. 9D is for illustration only.

For yet another example, the higher layer parameter can be a resource indication value (RIV). An illustration of this example is shown in FIG. 9D.

In one example, the pattern of including sub-channels in the resource pool is repeated every $N_{subchannel}^{group}$ sub-channels, where $N_{subchannel}^{group}$ is a number of sub-channels in a group of contiguous sub-channels.

In another example, the pattern of including sub-channels in the resource pool is determined by a starting sub-channel index and a duration of contiguous sub-channels jointly coded as a RIV, wherein the maximum value for the starting sub-channel index and the duration of contiguous sub-channels is $N_{subchannel}^{group}$.

In yet another example, it's assumed that each sub-channel in the resource pool has the same number of RB s, e.g., $N_{RB}^{subchannel}$ can be fixed or provided by a higher layer parameter. For one sub-example, $N_{RB}^{subchannel}$ can be fixed as 1 (in this sub-example, a sub-channel is same as an RB).

In yet another example, $N_{subchannel}^{group}$ can be fixed in the specification or provided by a higher layer parameter. For one sub-example, $N_{subchannel}^{group}$ can be fixed as 1 (in this sub-example, a sub-channel group is same as a sub-channel). For another sub-example, $N_{subchannel}^{group}$ can be fixed as $N_{subchannel}^{group}=5$ or $N_{subchannel}^{group}=10$.

In yet another example, the number of sub-channels included in the resource pool (e.g., $N_{subchannel}^{SL}$) can be determined as the product of the duration of the contiguous sub-channels determined by the RIV and the number of sub-channel groups in the BWP.

In yet another example, there can be a restriction on the RIV such that the indicated sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the RIV such that the indicated sub-channels included in the resource pool satisfy the PSD requirement according to the regulation for operation with shared spectrum channel access when applicable.

Figure 9E:
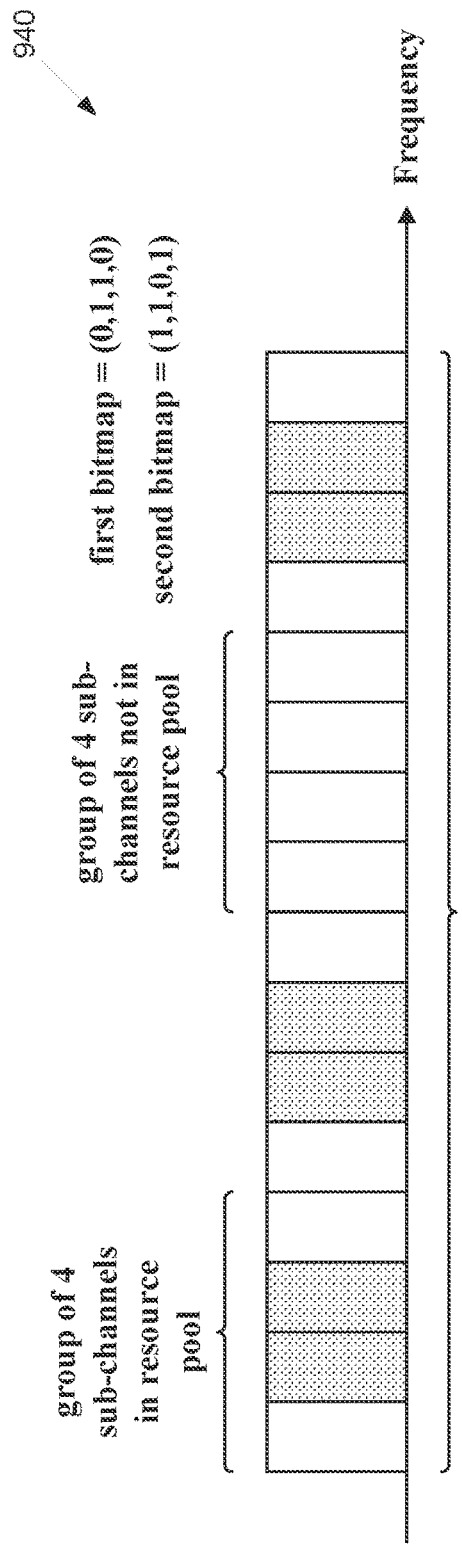
FIG. 9E illustrates yet an example of non-contiguous sub-channel based resource pool according to embodiments of the present disclosure.

FIG. 9E illustrates yet an example of non-contiguous sub-channel based resource pool 940 according to embodiments of the present disclosure. An embodiment of the non-contiguous sub-channel based resource pool 940 shown in FIG. 9E is for illustration only.

For yet another example, the higher layer parameters can include two bitmaps. An illustration of this example is shown in FIG. 9E.

In one example, a first bitmap indicates whether sub-channels in a group of contiguous sub-channels are included in the resource pool, wherein the length of the bitmap can be determined by $N_{subchannel}^{group}$.

In another example, a second bitmap indicates whether the groups of contiguous sub-channels are included in the resource pool, wherein the length of the bitmap can be determined by $\lfloor N_{RB}^{BWP}/(N_{RB}^{subchannel} \cdot N_{subchannel}^{group}) \rfloor$, where $N_{RB}^{BWP}$ is the number of RBs in the SL BWP, $N_{RB}^{subchannel}$ is the number of RBs in a sub-channel, and $N_{subchannel}^{group}$ is a number of sub-channels in a group of contiguous sub-channels.

In yet another example, it's assumed that each sub-channel in the resource pool has the same number of RBs, e.g., $N_{RB}^{subchannel}$ can be fixed or provided by a higher layer parameter. For one sub-example, $N_{RB}^{subchannel}$ can be fixed as 1 (in this sub-example, a sub-channel is same as an RB).

In yet another example, $N_{subchannel}^{group}$ can be fixed in the specification or provided by a higher layer parameter. For one sub-example, $N_{subchannel}^{group}$ can be fixed as 1 (in this sub-example, a sub-channel group is same as a sub-channel). For another sub-example, $N_{subchannel}^{group}$ can be fixed as $N_{subchannel}^{group}=5$ or $N_{subchannel}^{group}=10$.

In yet another example, the number of sub-channels included in the resource pool (e.g., $N_{subchannel}^{SL}$) can be determined as the product of the number of bits taking value of 1 in the two bitmaps.

In yet another example, there can be a restriction on the bitmaps such that the indicated sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the bitmaps such that the indicated sub-channels included in the resource pool satisfy the PSD requirement according to the regulation for operation with shared spectrum channel access when applicable. For one sub-example, there can be a restriction that the number of consecutive bits taking value of 0 in first and/or the second bitmap cannot exceed or is smaller than a predefined threshold number.

Figure 9F:
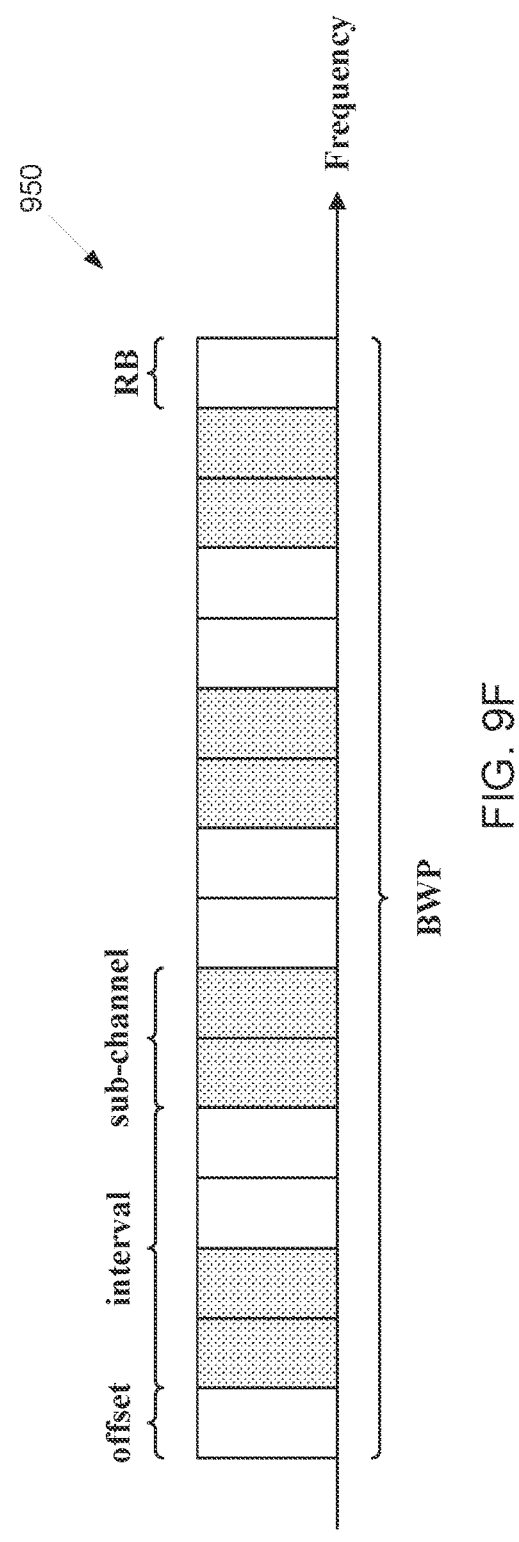
FIG. 9F illustrates yet an example of non-contiguous sub-channel based resource pool according to embodiments of the present disclosure.

FIG. 9F illustrates yet an example of non-contiguous sub-channel based resource pool 950 according to embodiments of the present disclosure. An embodiment of the non-contiguous sub-channel based resource pool 950 shown in FIG. 9F is for illustration only.

For yet another example, the higher layer parameters can include at least one of a size of the sub-channel (e.g., in RB, and denoted as $N_{RB}^{subchannel}$), an offset (e.g., in RB, and denoted as $N_{RB}^{offset}$) between the start of the first sub-channel and the start of the SL BWP, and an interval (e.g., in RB, and denoted as $N_{RB}^{interval}$) between the start of two neighboring sub-channels. An illustration of this example is shown in FIG. 9F.

In one example, the indexes of RB for the sub-channels included in the resource pool can be determined as $N_{RB}^{offset}+\{0,\ldots,N_{RB}^{subchannel}-1\}+N_{RB}^{interval}\cdot n$, where the RB with index 0 is the first RB in the SL BWP, and $n \in S$ is an integer such that the RB in the sub-channels is not exceeding the bandwidth of the SL BWP.

In another example, the number of sub-channels included in the resource pool (e.g., $N_{subchannel}^{SL}$) can be determined as the number of elements in set S.

In yet another example, if at least one of the size of the sub-channel $N_{RB}^{subchannel}$, the offset $N_{RB}^{offset}$ between the start of the first sub-channel and the start of the SL BWP, and the interval $N_{RB}^{interval}$ between the start of two neighboring sub-channels is not provided by higher layer parameters, it is fixed or pre-determined to the UE. For one sub-example, the size of the sub-channel $N_{RB}^{subchannel}$ can be fixed or pre-determined to the UE as 1 (in this sub-example, a sub-channel is same as an RB). For another sub-example, the offset $N_{RB}^{offset}$ between the start of the first sub-channel and the start of the SL BWP can be fixed as 0. For yet another sub-example, the offset $N_{RB}^{offset}$ between the start of the first sub-channel and the start of the SL BWP can be pre-determined to the UE, e.g., based on the UE ID. For yet another sub-example, the interval $N_{RB}^{interval}$ between the start of two neighboring sub-channels can be fixed, e.g., $N_{RB}^{interval}=1$, or $N_{RB}^{interval}=5$ or $N_{RB}^{interval}=10$.

In yet another example, there can be a restriction on the RBs of the sub-channels such that the sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the RBs such that the sub-channels included in the resource pool satisfy the PSD requirement according to the regulation for operation with shared spectrum channel access when applicable. For one sub-example, there can be a restriction that the ratio between $N_{RB}^{subchannel}$ and $N_{RB}^{interval}$ cannot exceed or is smaller than a predefined threshold ratio.

Figure 9G:
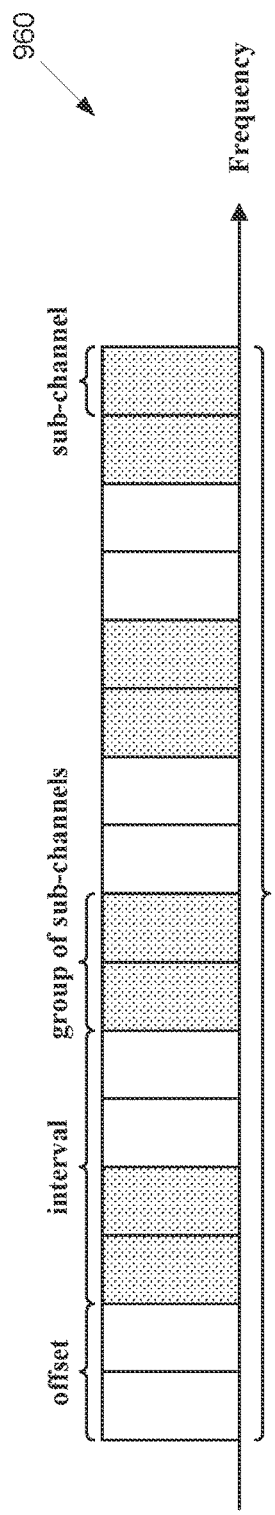
FIG. 9G illustrates yet an example of non-contiguous sub-channel based resource pool according to embodiments of the present disclosure.

FIG. 9G illustrates yet an example of non-contiguous sub-channel based resource pool 960 according to embodiments of the present disclosure. An embodiment of the non-contiguous sub-channel based resource pool 960 shown in FIG. 9G is for illustration only.

For yet another example, the higher layer parameters can include at least one of a size of the sub-channel (e.g., in RB, and denoted as $N_{RB}^{subchannel}$), a number of sub-channels in a group of contiguous sub-channels (e.g., denoted as $N_{subchannel}^{group}$), an offset (e.g., in number of sub-channels, and denoted as $N_{subchannel}^{offset}$) between the start of the first sub-channel and the start of the SL BWP, and an interval (e.g., in number of sub-channels, and denoted as $N_{subchannel}^{interval}$) between the start of two neighboring groups of sub-channels. An illustration of this example is shown in FIG. 9G.

In one example, the indexes of RB for the sub-channels included in the resource pool can be determined as $N_{subchannel}^{offset} \cdot N_{RB}^{subchannel} + \{0, \ldots, N_{subchannel}^{group} \cdot N_{RB}^{subchannel} - 1\} + N_{subchannel}^{interval} \cdot N_{RB}^{subchannel} \cdot n$, where the RB with index 0 is the first RB in the SL BWP, and n∈S is an integer such that the RB in the sub-channels is not exceeding the bandwidth of the SL BWP.

In another example, the number of sub-channels included in the resource pool (e.g., $N_{subchannel}^{SL}$) can be determined $N_{subchannel}^{group}$ times the number of elements in set S.

In yet another example, if at least one of the size of the sub-channel $N_{RB}^{subchannel}$, the number of sub-channels in a group of contiguous sub-channels $N_{subchannel}^{group}$, the offset $N_{subchannel}^{offset}$ between the start of the first sub-channel and the start of the SL BWP, and the interval $N_{subchannel}^{interval}$ between the start of two neighboring groups of sub-channels is not provided by higher layer parameters, it is fixed or pre-determined to the UE. For one sub-example, the size of the sub-channel $N_{RB}^{subchannel}$ can be fixed or pre-determined to the UE as 1 (in this sub-example, a sub-channel is same as an RB). For another sub-example, the offset $N_{subchannel}^{offset}$ between the start of the first sub-channel and the start of the SL BWP can be fixed as 0.

For yet another sub-example, the offset $N_{subchannel}^{offset}$ between the start of the first sub-channel and the start of the SL BWP can be pre-determined to the UE, e.g., based on the UE ID. For yet another example, the number of sub-channels in a group of contiguous sub-channels $N_{subchannel}^{group}$ can be fixed as 1 (e.g., a sub-channel group is same as a sub-channel). For yet another sub-example, the interval $N_{RB}^{interval}$ between the start of two neighboring sub-channels can be fixed, e.g., $N_{RB}^{interval}=1$, or $N_{RB}^{interval}=5$ or $N_{RB}^{interval}=10$.

In yet another example, there can be a restriction on the RBs of the sub-channels such that the sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the RBs such that the sub-channels included in the resource pool satisfy the PSD requirement according to the regulation for operation with shared spectrum channel access when applicable. For one sub-example, there can be a restriction that the ratio between $N_{subchannel}^{group}$ and $N_{subchannel}^{interval}$ cannot exceed or is smaller than a and predefined threshold ratio.

Figure 9H:
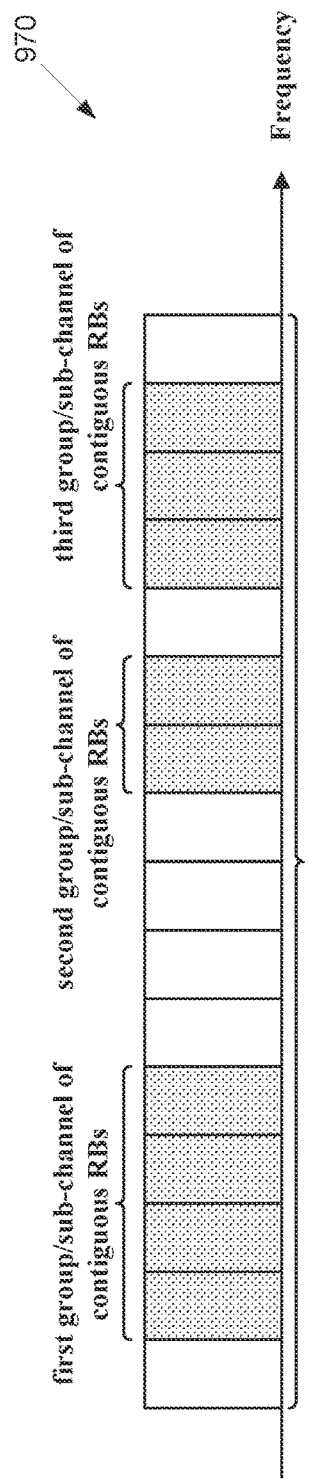
FIG. 9H illustrates yet an example of non-contiguous sub-channel based resource pool according to embodiments of the present disclosure.

FIG. 9H illustrates yet an example of non-contiguous sub-channel based resource pool 970 according to embodiments of the present disclosure. An embodiment of the non-contiguous sub-channel based resource pool 970 shown in FIG. 9H is for illustration only.

For yet another example, the higher layer parameters can include a k-order RIV (up to k starting indexes and durations jointly coded using a RIV), where k is the number of groups of RBs included in the resource pool, each group consists of contiguous RBs, and groups of RBs are non-contiguous. An illustration of this example is shown in FIG. 9H.

In one example, a group of contiguous RBs can be considered as a sub-channel, and the size of sub-channels in a resource pool may not be the same.

In another example, there can be a restriction on the RBs of the sub-channels such that the sub-channels included in the resource pool satisfy the OCB requirement according to the regulation for operation with shared spectrum channel access when applicable. For one sub-example, the frequency domain difference between the lowest RE of the first RB included in the resource pool and highest RE of the last RB included in the resource pool is no less than a predefined threshold ratio of the nominal channel bandwidth.

In yet another example, there can be a restriction on the RBs such that the RBs included in the resource pool satisfy the PSD requirement according to the regulation for operation with shared spectrum channel access when applicable.

Figure 9I:
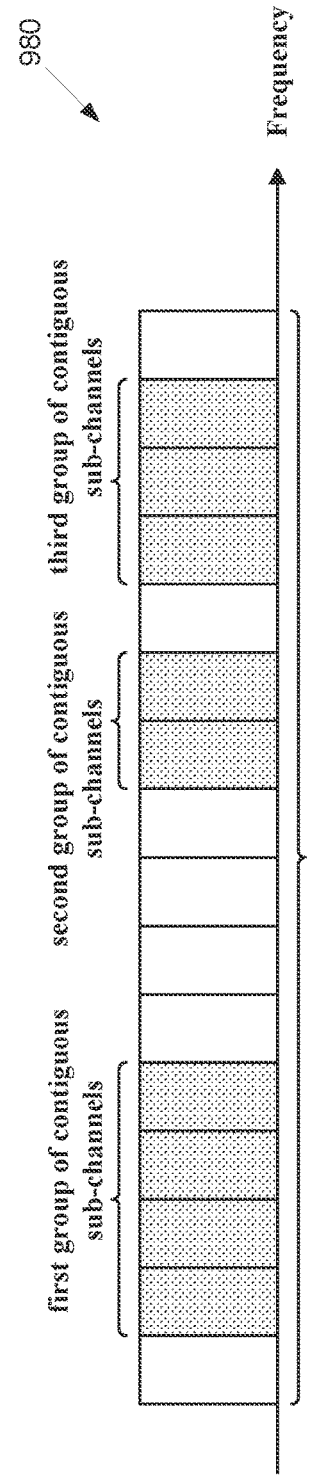
FIG. 9I illustrates yet an example of non-contiguous sub-channel based resource pool according to embodiments of the present disclosure.

FIG. 9I illustrates yet an example of non-contiguous sub-channel based resource pool 980 according to embodiments of the present disclosure. An embodiment of the non-contiguous sub-channel based resource pool 980 shown in FIG. 9I is for illustration only.

For yet another example, the higher layer parameters can include a k-order RIV (up to k starting indexes and durations jointly coded using a RIV), where k is the number of groups of sub-channels included in the resource pool, each group consists of contiguous sub-channels, and groups of sub-channels are non-contiguous. An illustration of this example is shown in FIG. 9I.

In one example, it's assumed that each sub-channel in the resource pool has the same number of RBs, e.g., $N_{RB}^{subchannel}$ can be fixed or provided by a higher layer parameter.

In another example, there can be a restriction on the RBs of the sub-channels such that the sub-channels included in the resource pool satisfy the OCB requirement according to the regulation for operation with shared spectrum channel access when applicable. For one sub-example, the frequency domain difference between the lowest RE of the first sub-channel included in the resource pool and highest RE of the last sub-channel included in the resource pool is no less than a predefined threshold ratio of the nominal channel bandwidth.

In yet another example, there can be a restriction on the RB s such that the sub-channels included in the resource pool satisfy the PSD requirement according to the regulation for operation with shared spectrum channel access when applicable.

In one embodiment, there is an indication on whether resource allocation for sidelink signal(s) and/or channel(s) is based on sub-channels that can be either contiguous or non-contiguous.

In one example, there is an indication on whether resource allocation for PSSCH is based on non-contiguous sub-channels, by higher layer parameter. For one instance, this higher layer parameter can be associated with the configuration of the BWP. For another instance, this higher layer parameter can be associated with the configuration of the resource pool.

In another example, there is an indication on whether resource allocation for PSCCH is based on non-contiguous sub-channels, by higher layer parameter. For one instance, this higher layer parameter can be associated with the configuration of the BWP. For another instance, this higher layer parameter can be associated with the configuration of the resource pool.

In yet another example, there is an indication on whether resource allocation for PSFCH is based on non-contiguous sub-channels, by higher layer parameter. For one instance, this higher layer parameter can be associated with the configuration of the BWP. For another instance, this higher layer parameter can be associated with the configuration of the resource pool.

In yet another example, there can be an indication on whether resource allocation for PSSCH and PSCCH is based on non-contiguous sub-channels, by higher layer parameter. For this example, the UE assumes PSSCH and PSCCH share the same resource allocation method, either both based on interlace or both not based on interlace. For one instance, this higher layer parameter can be associated with the configuration of the BWP. For another instance, this higher layer parameter can be associated with the configuration of the resource pool.

In yet another example, there can be an indication on whether resource allocation for PSSCH and PSFCH is based on non-contiguous sub-channels, by higher layer parameter. For this example, the UE assumes PSSCH and PSFCH share the same resource allocation method, either both based on interlace or both not based on interlace. For one instance, this higher layer parameter can be associated with the configuration of the BWP. For another instance, this higher layer parameter can be associated with the configuration of the resource pool.

In yet another example, there can be an indication on whether resource allocation for PSCCH and PSFCH is based on non-contiguous sub-channels, by higher layer parameter. For this example, the UE assumes PSCCH and PSFCH share the same resource allocation method, either both based on interlace or both not based on interlace. For one instance, this higher layer parameter can be associated with the configuration of the BWP. For another instance, this higher layer parameter can be associated with the configuration of the resource pool.

In yet another example, there can be an indication on whether resource allocation for PSSCH, PSCCH and PSFCH is based on non-contiguous sub-channels, by higher layer parameter. For this example, the UE assumes PSSCH, PSCCH and PSFCH share the same resource allocation method, either all based on interlace or all not based on interlace. For one instance, this higher layer parameter can be associated with the configuration of the BWP. For another instance, this higher layer parameter can be associated with the configuration of the resource pool.

In one example, the UE assumes the indication on whether non-contiguous sub-channels based resource allocation is utilized for sidelink (e.g., at least for one of PSSCH, PSCCH, or PSFCH) has the same value as the indication on whether interlace based resource allocation is utilized for PUSCH and PUCCH (e.g., useInterlacePUCCH-PUSCH in BWP-UplinkCommon or useInterlacePUCCH-PUSCH in BWP-UplinkDedicated). The UE doesn't expect to be configured to enable non-contiguous sub-channels based resource allocation for sidelink (e.g., at least for one of PSSCH, PSCCH, or PSFCH), if interlace based resource allocation for PUSCH and PUCCH is not enabled.

In another embodiment, whether resource allocation for sidelink signal(s) and/or channel(s) is based on non-contiguous sub-channels can be a UE capability. For one example, the UE capability can be indicated to a gNB by a higher layer parameter.

In one embodiment, the frequency domain resource allocation for PSSCH can be based on a resource pool including either contiguous or non-contiguous sub-channels. The frequency domain resource allocation for PSSCH can be indicated by at least one of a sidelink control information (SCI) (e.g., SCI format 1-A) or a downlink control information (DCI) (e.g., DCI format 3_0), depending on the resource allocation mode.

In one example, the frequency domain resource allocation for PSSCH is based on a number of sub-channels within the resource pool, wherein the sub-channels are relatively contiguous within the resource pool. For instance, the sub-channels could be possibly non-contiguous in the absolute frequency, but could be relatively contiguous within the resource pool based a number of non-contiguous sub-channels. If there is a relative sub-channel index defined within the resource pool, then a number of sub-channels allocated for PDSSCH in this example can be a set of sub-channels with contiguous relative sub-channel indexes.

In another example, the frequency domain resource allocation for PSSCH is based on a number of sub-channel groups within the resource pool, wherein the sub-channel groups are relatively contiguous within the resource pool. For instance, the sub-channel groups could be possibly non-contiguous in the absolute frequency, but could be relatively contiguous within the resource pool based a number of non-contiguous sub-channels. If there is a relative sub-channel group index defined within the resource pool, then a number of sub-channel groups allocated for PDSSCH in this example can be a set of sub-channel groups with contiguous relative sub-channel group indexes.

In yet another example, the frequency domain resource allocation for PSSCH is based on a RIV, wherein the index of starting sub-channel and the number of sub-channels is jointly coded using the RIV, and are both defined based on the relative sub-channel index within the resource pool.

In yet another example, the frequency domain resource allocation for PSSCH is based on a RIV, wherein the index of starting sub-channel group and the number of sub-channel groups is jointly coded using the RIV, and are both defined based on the relative sub-channel group index within the resource pool.

In yet another example, the frequency domain resource allocation for PSSCH is based on a RIV, wherein the index of starting sub-channel and the number of sub-channel is jointly coded using the RIV, and are both defined based on the relative sub-channel index within the sub-channel group.

In yet another example, the frequency domain resource allocation for PSSCH can be based on a bitmap, where the length of the bitmap is same as the number of sub-channels included in the resource pool (e.g., $N_{subchannel}^{SL}$). A bit in the bitmap taking value of 1 indicates the corresponding sub-channel is allocated for PSSCH, and a bit in the bitmap taking value of 0 indicates the corresponding sub-channel is not allocated for PSSCH.

In yet another example, the frequency domain resource allocation for PSSCH can be based on a bitmap, where the length of the bitmap is same as the number of sub-channel groups included in the resource pool (e.g., $N_{subchannel}^{SL}/N_{subchannel}^{group}$) A bit in the bitmap taking value of 1 indicates the corresponding group of sub-channel(s) is allocated for PSSCH, and a bit in the bitmap taking value of 0 indicates the corresponding group of sub-channel(s) is not allocated for PSSCH.

In yet another example, the frequency domain resource allocation for PSSCH can be based on a bitmap, where the length of the bitmap is same as the number of sub-channels within a sub-channel group (e.g., $N_{subchannel}^{group}$). A bit in the bitmap taking value of 1 indicates the corresponding sub-channel in all the (applicable) sub-channel groups is allocated for PSSCH, and a bit in the bitmap taking value of 0 indicates the corresponding sub-channel in all the (applicable) sub-channel groups is not allocated for PSSCH.

In yet another example, the frequency domain resource allocation for PSSCH can be based on two bitmaps, where the length of the first bitmap is same as the number of sub-channels within a sub-channel group (e.g., $N_{subchannel}^{group}$), and the length of the second bitmap is same as the number of sub-channel-groups in the resource pool (e.g., $N_{subchannel}^{SL}/N_{subchannel}^{group}$). A bit in the first bitmap taking value of 1 indicates the corresponding sub-channel in all the applicable sub-channel groups (e.g., indicated by the second bitmap) is allocated for PSSCH, and a bit in the first bitmap taking value of 0 indicates the corresponding sub-channel in all the applicable sub-channel groups (e.g., indicated by the second bitmap) is not allocated for PSSCH. A bit in the second bitmap taking value of 1 indicates the corresponding sub-channel group is allocated for PSSCH, and a bit in the second bitmap taking value of 0 indicates the corresponding sub-channel group is not allocated for PSSCH.

In one embodiment, the frequency domain resource allocation for PSCCH can be based on a resource pool including either contiguous or non-contiguous sub-channels.

In one example, the frequency domain resource allocation for PSCCH can be configured by higher layer parameter, wherein the frequency domain resource can be indicated as a number of RBs. In one instance, the set of RBs for PSCCH can be the lowest RBs within the frequency domain resources allocated for PSSCH. For this instance, the set of RBs could be possibly non-contiguous in the absolute frequency, but contiguous in term of the relative RB index within the resource pool. For this instance, the set of RBs could be possibly non-contiguous in the absolute frequency, but contiguous in term of the relative RB index within the resource pool.

In another instance, the set of RBs for PSCCH can be a number of contiguous RBs within the frequency domain resources allocated for PSSCH, wherein the starting RB index is also provided by the higher layer parameter. For this instance, the set of RBs could be possibly non-contiguous in the absolute frequency, but contiguous in term of the relative RB index within the resource pool. In yet another instance, there could be a further restriction that the set of RBs are restricted to be contiguous in the absolute frequency.

In another example, the frequency domain resource allocation for PSCCH can be configured by higher layer parameter, wherein the frequency domain resource can be indicated as a number of sub-channels. In one instance, the set of sub-channels for PSCCH can be the lowest sub-channels within the frequency domain resources allocated for PSSCH. For this instance, the set of sub-channels could be possibly non-contiguous in the absolute frequency, but contiguous in term of the relative sub-channel index within the resource pool.

In another instance, the set of sub-channels for PSCCH can be a number of contiguous sub-channels within the frequency domain resources allocated for PSSCH, wherein the starting sub-channel index is also provided by the higher layer parameter. For this instance, the set of sub-channels could be possibly non-contiguous in the absolute frequency, but contiguous in term of the relative sub-channel index within the resource pool. In yet another instance, there could be a further restriction that the set of sub-channels are restricted to be contiguous in the absolute frequency.

In yet another example, the frequency domain resource allocation for PSCCH can be configured by higher layer parameter, wherein the frequency domain resource can be indicated as a number of sub-channel groups. In one instance, the set of sub-channel groups for PSCCH can be the lowest sub-channel groups within the frequency domain resources allocated for PSSCH. For this instance, the set of sub-channel groups could be possibly non-contiguous in the absolute frequency, but contiguous in term of the relative sub-channel index within the resource pool.

In another instance, the set of sub-channel groups for PSCCH can be a number of contiguous sub-channel groups within the frequency domain resources allocated for PSSCH, wherein the starting sub-channel group index is also provided by the higher layer parameter. For this instance, the set of sub-channel groups could be possibly non-contiguous in the absolute frequency, but contiguous in term of the relative sub-channel group index within the resource pool. In another instance, there could be a further restriction that the set of sub-channel groups are restricted to be contiguous in the absolute frequency.

In yet another example, the frequency domain resource allocation for PSCCH can be based on a RIV, wherein the index of starting sub-channel and the number of sub-channels is jointly coded using the RIV, and are both defined based on the relative sub-channel index within the resource pool.

In yet another example, the frequency domain resource allocation for PSCCH can be based on a RIV, wherein the index of starting sub-channel group and the number of sub-channel groups is jointly coded using the RIV, and are both defined based on the relative sub-channel group index within the resource pool.

In yet another example, the frequency domain resource allocation for PSCCH can be based on a RIV, wherein the index of starting sub-channel and the number of sub-channel is jointly coded using the RIV, and are both defined based on the relative sub-channel index within the sub-channel group.

In yet another example, the frequency domain resource allocation for PSCCH can be based on a bitmap, where the length of the bitmap is same as the number of sub-channels included in the resource pool (e.g., $N_{subchannel}^{SL}$). A bit in the bitmap taking value of 1 indicates the corresponding sub-channel is allocated for PSCCH, and a bit in the bitmap taking value of 0 indicates the corresponding sub-channel is not allocated for PSCCH.

In yet another example, the frequency domain resource allocation for PSCCH can be based on a bitmap, where the length of the bitmap is same as the number of sub-channel groups included in the resource pool (e.g., $N_{subchannel}^{SL}/N_{subchannel}^{group}$). A bit in the bitmap taking value of 1 indicates the corresponding group of sub-channel(s) is allocated for PSCCH, and a bit in the bitmap taking value of 0 indicates the corresponding group of sub-channel(s) is not allocated for PSCCH.

In yet another example, the frequency domain resource allocation for PSCCH can be based on a bitmap, where the length of the bitmap is same as the number of sub-channels within a sub-channel group (e.g., $N_{subchannel}^{group}$). A bit in the bitmap taking value of 1 indicates the corresponding sub-channel in all the (applicable) sub-channel groups is allocated for PSCCH, and a bit in the bitmap taking value of 0 indicates the corresponding sub-channel in all the (applicable) sub-channel groups is not allocated for PSCCH.

In yet another example, the frequency domain resource allocation for PSCCH can be based on two bitmaps, where the length of the first bitmap is same as the number of sub-channels within a sub-channel group (e.g., $N_{subchannel}^{group}$), and the length of the second bitmap is same as the number of sub-channel-groups in the resource pool (e.g., $N_{subchannel}^{SL}/N_{subchannel}^{group}$). A bit in the first bitmap taking value of 1 indicates the corresponding sub-channel in all the applicable sub-channel groups (e.g., indicated by the second bitmap) is allocated for PSCCH, and a bit in the first bitmap taking value of 0 indicates the corresponding sub-channel in all the applicable sub-channel groups (e.g., indicated by the second bitmap) is not allocated for PSCCH. A bit in the second bitmap taking value of 1 indicates the corresponding sub-channel group is allocated for PSCCH, and a bit in the second bitmap taking value of 0 indicates the corresponding sub-channel group is not allocated for PSCCH.

In yet another example, the frequency domain resource allocation for PSCCH can be based on a bitmap, where the length of the bitmap is same as the number of sub-channels configured for PSSCH. A bit in the bitmap taking value of 1 indicates the corresponding sub-channel is allocated for PSCCH, and a bit in the bitmap taking value of 0 indicates the corresponding sub-channel is not allocated for PSCCH.

In yet another example, the frequency domain resource allocation for PSCCH can be based on a bitmap, where the length of the bitmap is same as the number of sub-channel groups configured for PSSCH. A bit in the bitmap taking value of 1 indicates the corresponding group of sub-channel(s) is allocated for PSCCH, and a bit in the bitmap taking value of 0 indicates the corresponding group of sub-channel(s) is not allocated for PSCCH.

In yet another example, the frequency domain resource allocation for PSCCH can be based on a bitmap, where the length of the bitmap is same as the number of RBs configured for PSSCH. A bit in the bitmap taking value of 1 indicates the corresponding RB is allocated for PSCCH, and a bit in the bitmap taking value of 0 indicates the corresponding RB is not allocated for PSCCH.

In one embodiment, the frequency domain resource allocation for PSFCH can be based on the non-contiguous sub-channel based resource pool.

In one example, the frequency domain resource allocation for PSFCH can be configured by higher layer parameter, wherein the frequency domain resource can be indicated as a number of RBs. In one instance, the set of RBs for PSFCH can be the lowest RBs within the frequency domain resources allocated for PSSCH. For this instance, the set of RBs could be possibly non-contiguous in the absolute frequency, but contiguous in term of the relative RB index within the resource pool. For this instance, the set of RBs could be possibly non-contiguous in the absolute frequency, but contiguous in term of the relative RB index within the resource pool.

In another instance, the set of RBs for PSFCH can be a number of contiguous RBs within the frequency domain resources allocated for PSSCH, wherein the starting RB index is also provided by the higher layer parameter. For this instance, the set of RBs could be possibly non-contiguous in the absolute frequency, but contiguous in term of the relative RB index within the resource pool. In yet another instance, there could be a further restriction that the set of RBs are restricted to be contiguous in the absolute frequency.

In another example, the frequency domain resource allocation for PSFCH can be configured by higher layer parameter, wherein the frequency domain resource can be indicated as a number of sub-channels. In one instance, the set of sub-channels for PSFCH can be the lowest sub-channels within the frequency domain resources allocated for PSSCH. For this instance, the set of sub-channels could be possibly non-contiguous in the absolute frequency, but contiguous in term of the relative sub-channel index within the resource pool.

In another instance, the set of sub-channels for PSFCH can be a number of contiguous sub-channels within the frequency domain resources allocated for PSSCH, wherein the starting sub-channel index is also provided by the higher layer parameter. For this instance, the set of sub-channels could be possibly non-contiguous in the absolute frequency, but contiguous in term of the relative sub-channel index within the resource pool. In yet another instance, there could be a further restriction that the set of sub-channels are restricted to be contiguous in the absolute frequency.

In yet another example, the frequency domain resource allocation for PSFCH can be configured by higher layer parameter, wherein the frequency domain resource can be indicated as a number of sub-channel groups. In one instance, the set of sub-channel groups for PSFCH can be the lowest sub-channel groups within the frequency domain resources allocated for PSSCH. For this instance, the set of sub-channel groups could be possibly non-contiguous in the absolute frequency, but contiguous in term of the relative sub-channel index within the resource pool. In another instance, the set of sub-channel groups for PSFCH can be a number of contiguous sub-channel groups within the frequency domain resources allocated for PSSCH, wherein the starting sub-channel group index is also provided by the higher layer parameter.

For this instance, the set of sub-channel groups could be possibly non-contiguous in the absolute frequency, but contiguous in term of the relative sub-channel group index within the resource pool. In another instance, there could be a further restriction that the set of sub-channel groups are restricted to be contiguous in the absolute frequency.

In yet another example, the frequency domain resource allocation for PSFCH can be based on a RIV, wherein the index of starting sub-channel and the number of sub-channels is jointly coded using the RIV, and are both defined based on the relative sub-channel index within the resource pool.

In yet another example, the frequency domain resource allocation for PSFCH can be based on a RIV, wherein the index of starting sub-channel group and the number of sub-channel groups is jointly coded using the RIV, and are both defined based on the relative sub-channel group index within the resource pool.

In yet another example, the frequency domain resource allocation for PSFCH can be based on a RIV, wherein the index of starting sub-channel and the number of sub-channel is jointly coded using the RIV, and are both defined based on the relative sub-channel index within the sub-channel group.

In yet another example, the frequency domain resource allocation for PSFCH can be based on a bitmap, where the length of the bitmap is same as the number of sub-channels included in the resource pool (e.g., $N_{subchannel}^{SL}$). A bit in the bitmap taking value of 1 indicates the corresponding sub-channel is allocated for PSFCH, and a bit in the bitmap taking value of 0 indicates the corresponding sub-channel is not allocated for PSFCH.

In yet another example, the frequency domain resource allocation for PSFCH can be based on a bitmap, where the length of the bitmap is same as the number of sub-channel groups included in the resource pool (e.g., $N_{subchannel}^{SL}/N_{subchannel}^{group}$). A bit in the bitmap taking value of 1 indicates the corresponding group of sub-channel(s) is allocated for PSFCH, and a bit in the bitmap taking value of 0 indicates the corresponding group of sub-channel(s) is not allocated for PSFCH.

In yet another example, the frequency domain resource allocation for PSFCH can be based on a bitmap, where the length of the bitmap is same as the number of sub-channels within a sub-channel group (e.g., $N_{subchannel}^{group}$). A bit in the bitmap taking value of 1 indicates the corresponding sub-channel in all the (applicable) sub-channel groups is allocated for PSFCH, and a bit in the bitmap taking value of 0 indicates the corresponding sub-channel in all the (applicable) sub-channel groups is not allocated for PSFCH.

In yet another example, the frequency domain resource allocation for PSFCH can be based on two bitmaps, where the length of the first bitmap is same as the number of sub-channels within a sub-channel group (e.g., $N_{subchannel}^{group}$), and the length of the second bitmap is same as the number of sub-channel-groups in the resource pool (e.g., $N_{subchannel}^{SL}/N_{subchannel}^{group}$). A bit in the first bitmap taking value of 1 indicates the corresponding sub-channel in all the applicable sub-channel groups (e.g., indicated by the second bitmap) is allocated for PSFCH, and a bit in the first bitmap taking value of 0 indicates the corresponding sub-channel in all the applicable sub-channel groups (e.g., indicated by the second bitmap) is not allocated for PSFCH. A bit in the second bitmap taking value of 1 indicates the corresponding sub-channel group is allocated for PSFCH, and a bit in the second bitmap taking value of 0 indicates the corresponding sub-channel group is not allocated for PSFCH.

In yet another example, the frequency domain resource allocation for PSFCH can be based on a bitmap, where the length of the bitmap is same as the number of sub-channels configured for PSSCH. A bit in the bitmap taking value of 1 indicates the corresponding sub-channel is allocated for PSFCH, and a bit in the bitmap taking value of 0 indicates the corresponding sub-channel is not allocated for PSFCH.

In yet another example, the frequency domain resource allocation for PSFCH can be based on a bitmap, where the length of the bitmap is same as the number of sub-channel groups configured for PSSCH. A bit in the bitmap taking value of 1 indicates the corresponding group of sub-channel(s) is allocated for PSFCH, and a bit in the bitmap taking value of 0 indicates the corresponding group of sub-channel(s) is not allocated for PSFCH.

In yet another example, the frequency domain resource allocation for PSFCH can be based on a bitmap, where the length of the bitmap is same as the number of RBs configured for PSSCH. A bit in the bitmap taking value of 1 indicates the corresponding RB is allocated for PSFCH, and a bit in the bitmap taking value of 0 indicates the corresponding RB is not allocated for PSFCH.

For a sidelink operation on an unlicensed or shared spectrum, there is a need to support flexible starting location in a slot for sidelink transmission since the channel access procedure can succeed at any moment in the slot. The present disclosure provides embodiments for supporting flexible starting location for sidelink transmission, and its impact to the time domain allocation for sidelink channels, including PSSCH and PSCCH.

The present disclosure provides embodiments for supporting flexible starting locations for sidelink transmission, to be compatible with the flexible location for completing channel access procedure. More precisely, the following components are provided in the present disclosure: (1) flexible starting symbol for sidelink transmission; (2) flexible starting symbol for PSSCH resource allocation; (3) flexible starting symbol for PSCCH resource allocation; and (4) PSSCH resource indication in SCI.

In one embodiment, there can be a set of one or multiple symbol(s) in a slot to be used as the starting symbol of sidelink transmission, e.g., for a given resource pool.

In one example, the symbol indexes for the set of one or more symbol(s) can be pre-configured and/or configured by higher layer parameter for a resource pool. For instance, for a given resource pool, indexes for a set of symbols can be pre-configured and/or configured by higher layer parameter (e.g., startSLsymbolList, or equivalently expressed as startSLsymbol, secondStartSLsymbol, . . . , and etc.), wherein a UE assumes a SL transmission can start according to one of the set of symbols. In one sub-example, the pre-configuration and/or higher layer parameter (e.g., startSLsymbolList) can be selected from any values between 0 and 13.

In another sub-example, the pre-configuration and/or higher layer parameter (e.g., startSLsymbolList) can be selected from a restricted set of values between 0 and 13, e.g., {0, 2, 4, 6, 7, 8, 10, 12}. In yet another sub-example, the pre-configuration and/or higher layer parameter (e.g., startSLsymbolList) can be selected from a restricted set of values between 0 and 13, and further subject to a maximum number of elements in the set (e.g., same as the maximum number of starting symbols), e.g., the maximum number of elements in the set is 2. In yet another sub-example, the pre-configuration and/or higher layer parameter (e.g., startSLsymbolList) can be selected from a restricted set of values between 0 and 13, and further subject to a minimum difference between the elements in the set (e.g., same as the minimum symbol gap between starting symbols), e.g., the minimum symbol gap is 2.

In yet another sub-example, the pre-configuration and/or higher layer parameter (e.g., startSLsymbolList) can be selected from a restricted set of values between 0 and 13, and further subject to a maximum number of elements in the set (e.g., same as the maximum number of starting symbols) and a minimum difference between the elements in the set (e.g., same as the minimum symbol gap between starting symbols), e.g., the maximum number of elements in the set is 2 and the minimum symbol gap is 2

In another example, the symbol indexes for the set of one or more symbol(s) can be fixed in the specification. For instance, for a given resource pool, indexes for a set of symbols can be fixed in the specification, wherein a UE assumes a SL transmission can start according to one of the set of symbols. In one sub-example, the fixed set of symbol index(es) can be selected from any values between 0 and 13. In another sub-example, the fixed set of symbol index(es) can be selected from a restricted set of values between 0 and 13, e.g., {0, 2, 4, 6, 7, 8, 10, 12}.

In yet another example, the symbol indexes for the set of one or more symbol(s) can be determined based on a starting symbol index (e.g., startSLsymbol) and a length of symbols (e.g., lengthSLsymbols), wherein at least one of the two parameters is provided by at least one of fixed value in specification, and/or pre-configuration, and/or configuration from higher layer, and/or MAC CE. In one sub-example, the symbol indexes for the set of one or more symbol(s) can be any symbol index between startSLsymbol and startSLsymbol+lengthSLsymbols−1. In another sub-example, the symbol indexes for the set of one or more symbol(s) can be selected from a restricted set of values between startSLsymbol and startSLsymbol+lengthSLsymbols−1.

In yet another example, the symbol index for one symbol within set of one or more symbol(s) can be provided by at least one of fixed value in specification, and/or pre-configuration, and/or configuration from higher layer, and/or MAC CE, and the set of one or more symbol(s) can be determined based on the symbol index the one symbol.

For instance, for a given resource pool, a symbol index can be provided by at least one of fixed value in specification, and/or pre-configuration, and/or configuration from higher layer, and/or MAC CE (e.g., startSLsymbol), and the UE can determine the set of one or more symbol(s) based on the provided symbol index (e.g., startSLsymbol), e.g., according to one of the following sub-examples: (1) {startSLsymbol}; (2) {startSLsymbol, startSLsymbol+7}; (3) {startSLsymbol, startSLsymbol+5}; (4) {startSLsymbol, startSLsymbol+6}; (5) {startSLsymbol, startSLsymbol+4, startSLsymbol+8}; (6) {startSLsymbol, startSLsymbol+4, startSLsymbol+8, startSLsymbol+12}; (7) {startSLsymbol, startSLsymbol+3, startSLsymbol+6, startSLsymbol+9}; (8) {startSLsymbol, startSLsymbol+3, startSLsymbol+6, startSLsymbol+9, startSLsymbol+12}; (9){startSLsymbol, startSLsymbol+2, startSLsymbol+4, startSLsymbol+6, startSLsymbol+8, startSLsymbol+10}; or (1) {startSLsymbol, startSLsymbol+2, startSLsymbol+4, startSLsymbol+6, startSLsymbol+8, startSLsymbol+10, startSLsymbol+12}.

In yet another example, at least one of a symbol index (e.g., startSLsymbol) and a symbol interval (e.g., intervalSLsymbol) can be provided by at least one of fixed value in specification, and/or pre-configuration, and/or configuration from higher layer, and/or MAC CE, and the set of one or more symbol(s) can be determined based on the symbol index and symbol interval. For instance, for a given resource pool, the set of one or more symbol(s) can be determined as {startSLsymbol, startSLsymbol+intervalSLsymbol, . . . , startSLsymbol+k intervalSLsymbol}, e.g., wherein startSLsymbol+k intervalSLsymbol≤13. For another instance, there can be a lower bound on the number of symbols available for SL transmission such that k has a corresponding lower bound as well, wherein the lower bound on the number of symbols available for SL transmission can be fixed (e.g., 7), or pre-configured, or configured by higher layer parameter.

In yet another example, the set of one or more symbol(s) can be determined from a table, wherein the index in the table (e.g., Index) and an index of a starting symbol (e.g., startSLsymbol) can be provided by at least one of fixed value in specification, and/or pre-configuration, and/or configuration from higher layer, and/or MAC CE. For instance, all or subset of rows from TABLE 1 or TABLE 2 can be used as example set of one or more symbol(s).

TABLE 1

Example table for starting symbol index(es) in a slot for SL transmissions

| Index | Starting symbol index(s) $N_{symb}^{SL}$ |
|---|---|
| 0 | {startSLsymbol} |
| 1 | {startSLsymbol, startSLsymbol+7} |
| 2 | {startSLsymbol, startSLsymbol+4, startSLsymbol+8} |
| 3 | {startSLsymbol, startSLsymbol+3, startSLsymbol+6, startSLsymbol+9} |
| 4 | {startSLsymbol, startSLsymbol+2, startSLsymbol+4 startSLsymbol+6, startSLsymbol+8, startSLsymbol+10} |

TABLE 2

Example table for starting symbol index(es) in a slot for SL transmissions

| Index | Starting symbol index(s) $N_{symb}^{SL}$ |
|---|---|
| 0 | {startSLsymbol} |
| 1 | {startSLsymbol, startSLsymbol+7} |
| 2 | {startSLsymbol, startSLsymbol+4, startSLsymbol+8, startSLsymbol+12} |
| 3 | {startSLsymbol, startSLsymbol+3, startSLsymbol+6, startSLsymbol+9, startSLsymbol+12} |
| 4 | {startSLsymbol, startSLsymbol+2, startSLsymbol+4, startSLsymbol+6, startSLsymbol+8, startSLsymbol+10, startSLsymbol+12} |

In yet another example, a number of elements in the set of one or more symbol(s) (e.g., numStartSLsymbol) and an index of a starting symbol (e.g., startSLsymbol) can be provided by at least one of fixed value in specification, and/or pre-configuration, and/or configuration from higher layer, and/or MAC CE, and the set of one or more symbol(s) can be determined based on the number of elements in the set of one or more symbol(s) (e.g., numStartSLsymbol), e.g., according to all or subset of rows from TABLE 3, TABLE 4, or TABLE 5. In TABLE 5, N can be a positive integer. For one instance, N can be fixed, e.g., N=7 or N=5 or N=6. For another instance, N can be determined based on the value of startSLsymbol, such as N=floor((14−startSLsymbol)/2).

TABLE 3

Example table for starting symbol index(es) in a slot for SL transmissions

| numStartSLsymbol | Starting symbol index(s) $N_{symb}^{SL}$ |
|---|---|
| 1 | {startSLsymbol} |
| 2 | {startSLsymbol, startSLsymbol+7} |
| 3 | {startSLsymbol, startSLsymbol+4, startSLsymbol+8} |
| 4 | {startSLsymbol, startSLsymbol+3, startSLsymbol+6, startSLsymbol+9} |
| 5 | {startSLsymbol, startSLsymbol+2, startSLsymbol+4, startSLsymbol+6, startSLsymbol+8, startSLsymbol+10} |

TABLE 4

Example table for starting symbol index(es) in a slot for SL transmissions

| numStartSLsymbol | Starting symbol index(s) $N_{symb}^{SL}$ |
|---|---|
| 1 | {startSLsymbol} |
| 2 | {startSLsymbol, startSLsymbol+7} |
| 3 | {startSLsymbol, startSLsymbol+4, startSLsymbol+8, startSLsymbol+12} |
| 4 | {startSLsymbol, startSLsymbol+3, startSLsymbol+6, startSLsymbol+9, startSLsymbol+12} |
| 5 | {startSLsymbol, startSLsymbol+2, startSLsymbol+4, startSLsymbol+6, startSLsymbol+8, startSLsymbol+10, startSLsymbol+12} |

TABLE 5

Example table for starting symbol index(es)
in a slot for SL transmissions

| numStartSLsymbol | Starting symbol index(s) $N_{symb}^{SL}$ |
|---|---|
| 1 | {startSLsymbol} |
| 2 | {startSLsymbol, startSLsymbol+N} |

In yet another example, the set of one or more symbol(s) (e.g., $N_{symb}^{SL}$) can be determined based on whether the slot includes PSFCH occasion or not. For instance, when the slot includes PSFCH occasion, the set of one or more symbol(s) (e.g., $N_{symb}^{SL}$) can be determined in a first manner (e.g., according to a first example in the disclosure); and when the slot does not include PSFCH occasion, the set of one or more symbol(s) (e.g., $N_{symb}^{SL}$) can be determined in a second manner (e.g., according to a second example in the disclosure). For one sub-instance, a number of elements in the set of one or more symbol(s) is two, and the set of one or more symbol(s) (e.g., $N_{symb}^{SL}$) can be determined as {startSLsymbol, startSLsymbol+N1} if the slot includes PSFCH occasion; and determined as {startSLsymbol, startSLsymbol+N2} if the slot does not include PSFCH occasion, wherein N1 and N2 can be different. For one example of N1 and N2, N1 and N2 can be fixed, such as N1=7 and N2=5. For another example of N1 and N2, N1 and N2 can be determined based on startSLsymbol, such as N1=floor((14−startSLsymbol)/2) and N2=floor((11−startSLsymbol)/2).

For one sub-instance, a number of elements in the set of one or more symbol(s) is at most two, and the set of one or more symbol(s) (e.g., $N_{symb}^{SL}$) can be determined based on a first (pre-)configuration if the slot includes PSFCH occasion; and determined based on a second (pre-) configuration if the slot does not include PSFCH occasion.

For one sub-instance, a number of elements in the set of one or more symbol(s) is at most two, and the set of one or more symbol(s) (e.g., $N_{symb}^{SL}$) can be determined based on the (pre-) configuration including two starting locations if the slot does not include PSFCH occasion; and determined as a single starting location if the slot does not include PSFCH occasion. For example, the symbol location can be according to an example of the present disclosure.

In one example, one embodiment is provided to fix startSLsymbol in the specification, e.g., startSLsymbol is not provided by higher layer parameter but fixed, or startSLsymbol is provided by higher layer parameter with a fixed value. For instance, startSLsymbol can be fixed as 0 in at least one of the examples in this embodiment. For another instance, startSLsymbol can be fixed as 1 in at least one of the examples in this embodiment.

In yet another example, the starting symbol index(es) in at least one of the examples in this embodiment can be further restricted to be between the first symbol index and the last symbol index for SL transmission, wherein at least one of the first symbol index and last symbol index for SL transmission can be provided by at least one of fixed value in specification, and/or pre-configuration, and/or configuration from higher layer, and/or MAC CE, e.g., the starting symbol index(es) in at least one of the examples in this embodiment can be further taken an intersection with set [startSLsymbol, startSLsymbol+lengthSLsymbols−1].

In yet another example, one embodiment is provided to fix lengthSLsymbols in the specification, e.g., lengthSLsymbols is not pre-configured or provided by higher layer parameter but fixed, or lengthSLsymbols is pre-configured or provided by higher layer parameter with a fixed value. For instance, lengthSLsymbols can be fixed as 14 in at least one of the examples in this embodiment. For another instance, lengthSLsymbols can be fixed as 13 in at least one of the examples in this embodiment.

In yet another example, one embodiment is provided to add a limit to the number of symbols for SL transmission in a slot such that the determination of the starting symbol for SL transmission may guarantee at least $N_{symb,min}^{SL}$ number of symbols for SL transmission in slot. For one instance, $N_{symb,min}^{SL}$ can be fixed in the specification. For another instance, $N_{symb,min}^{SL}$ can be pre-configured and/or configured by higher layer parameter and/or provided by MAC CE. For another instance, the determination of $N_{symb,min}^{SL}$ can also depend on whether PSFCH is included in the slot.

In yet another example, the multiple starting symbols (e.g., two starting symbols) in a slot are applicable only for the first SL transmission in a channel occupancy, from the transmitter UE perspective, and a single starting symbol in a slot is applied after the first SL transmission in the channel occupancy. From the receiver UE point of view, if the UE is aware of a channel occupancy, the UE can assume single starting symbol after the first SL transmission in the channel occupancy.

In yet another example, for a slot including multiple starting symbols (e.g., two starting symbols), all the symbols corresponding to the starting symbols are used for AGC purpose. The PSSCH/PSCCH located in the next symbol after a starting symbol in the set of multiple starting symbols is repeated and transmitted on the starting symbol.

In yet another example, the multiple starting symbols (e.g., two starting symbols) in a slot can use different way to provide the information on the symbol index to the UE. For example, the first element in the multiple starting symbols (e.g., startSLsymbol) can be according to a first example in the disclosure (e.g., fixed in the specification), and the second or later element(s) in the multiple start symbols (e.g., secondStartSLsymbol, . . . , etc.) is according to a second example in the disclosure.

For the examples of this disclosure, the starting symbol for SL transmission can be SL denoted as $N_{symb}^{SL}$ in this disclosure. Based on the examples of this embodiment, one or multiple values of $N_{symb}^{SL}$ can be supported for a UE, and the UE may need to blind detect the actual starting symbol for SL transmission from the one or multiple values of $N_{symb}^{SL}$.

In one embodiment, the starting symbol for PSSCH resource allocation can be based on the starting symbol for SL transmission, wherein the starting symbol for SL transmission is flexible according to at least an example in this disclosure.

In one example, the resource allocation for PSSCH can start at symbol $N_{symb}^{SL}+1$, wherein $N_{symb}^{SL}$ is the starting symbol for SL transmission, e.g., according to at least an example in the present disclosure.

In one example, the symbol $N_{symb}^{SL}$ can be duplicated of symbol $N_{symb}^{SL}+1$.

Figure 10:
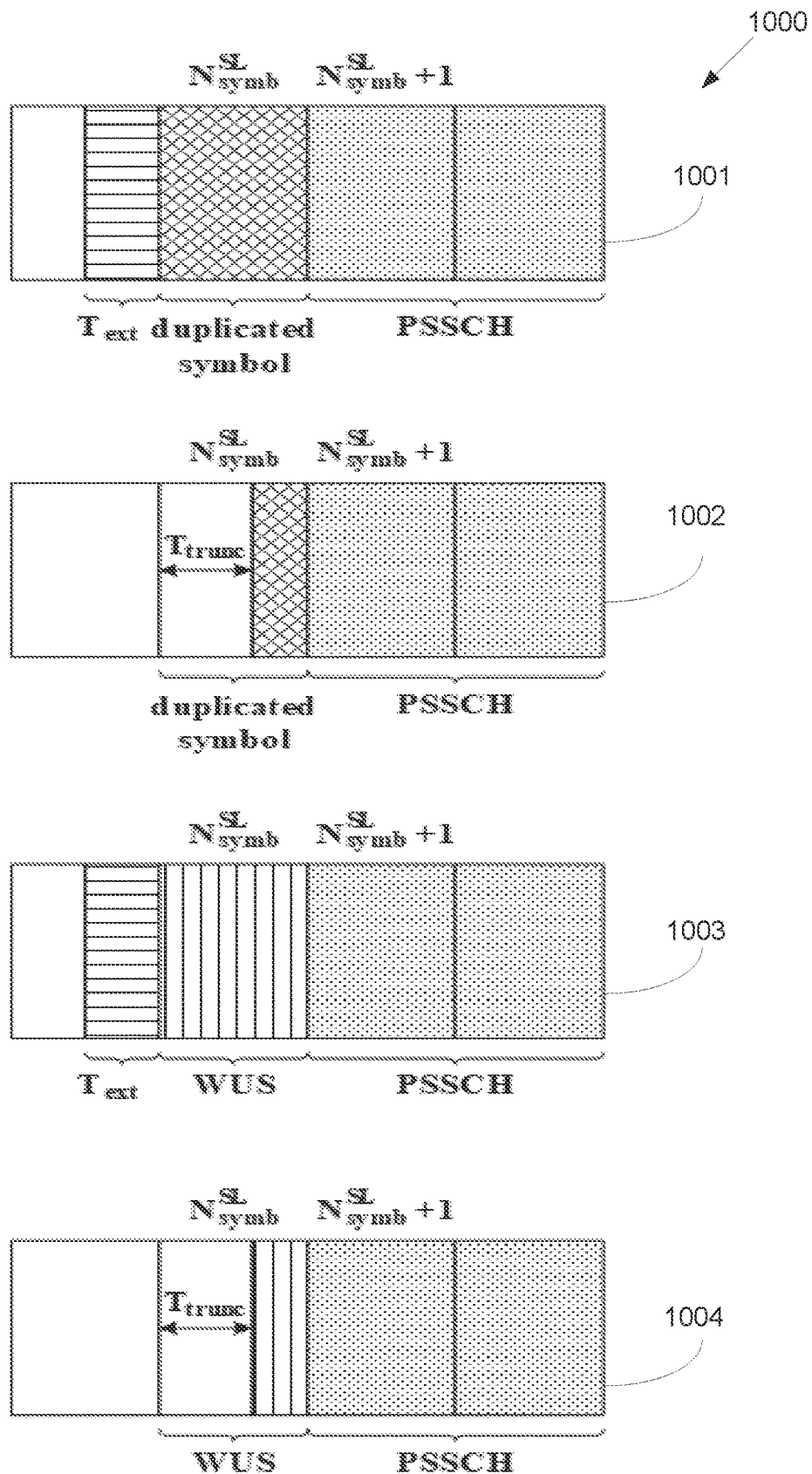
FIG. 10 illustrates an example of PSSCH resource allocation starting from second symbol of SL symbols according to embodiments of the present disclosure.

FIG. 10 illustrates an example of PSSCH resource allocation starting from second symbol of SL symbols 1000 according to embodiments of the present disclosure. An embodiment of the PSSCH resource allocation starting from second symbol of SL symbols 1000 shown in FIG. 10 is for illustration only.

In one instance, the symbol $N_{symb}^{SL}$ can be applied with CP extension with a duration of $T_{ext}$, wherein $T_{ext} \geq 0$ (and $T_{ext}=0$ refers to no CP extension). An example of this instance is shown in 1001 of FIG. 10.

In another instance, the symbol $N_{symb}^{SL}$ can be applied with a symbol truncation from the starting of the symbol with a duration of $T_{trunc}$, wherein $T_{trunc} \geq 0$ (and $T_{trunc}=0$ refers to no truncation). An example of this instance is shown in 1002 of FIG. 10.

In another example, the symbol $N_{symb}^{SL}$ can be used for a wake-up-signal (WUS), wherein the WUS can be mapped to the symbol with full bandwidth or partial of the bandwidth. For one sub-example, the WUS can be a sequence based signal, and a UE can detect its existence from correlation detection. For another sub-example, the WUS can be a message based channel (e.g., PSCCH), and a UE can detect its existence and the message from channel decoding.

In one instance, the symbol $N_{symb}^{SL}$ can be applied with CP extension with a duration of $T_{ext}$, wherein $T_{ext} \geq 0$ (and $T_{ext}=0$ refers to no CP extension). An example of this instance is shown in 1003 of FIG. 10.

In another instance, the symbol $N_{symb}^{SL}$ can be applied with a symbol truncation from the starting of the symbol with a duration of $T_{trunc}$, wherein $T_{trunc} \geq 0$ (and $T_{trunc}=0$ refers to no truncation). An example of this instance is shown in 1004 of FIG. 10.

In another example, the resource allocation for PSSCH can start at symbol $N_{symb}^{SL}$, wherein $N_{symb}^{SL}$ is the starting symbol for SL transmission, e.g., according to at least an example in this disclosure.

Figure 11:
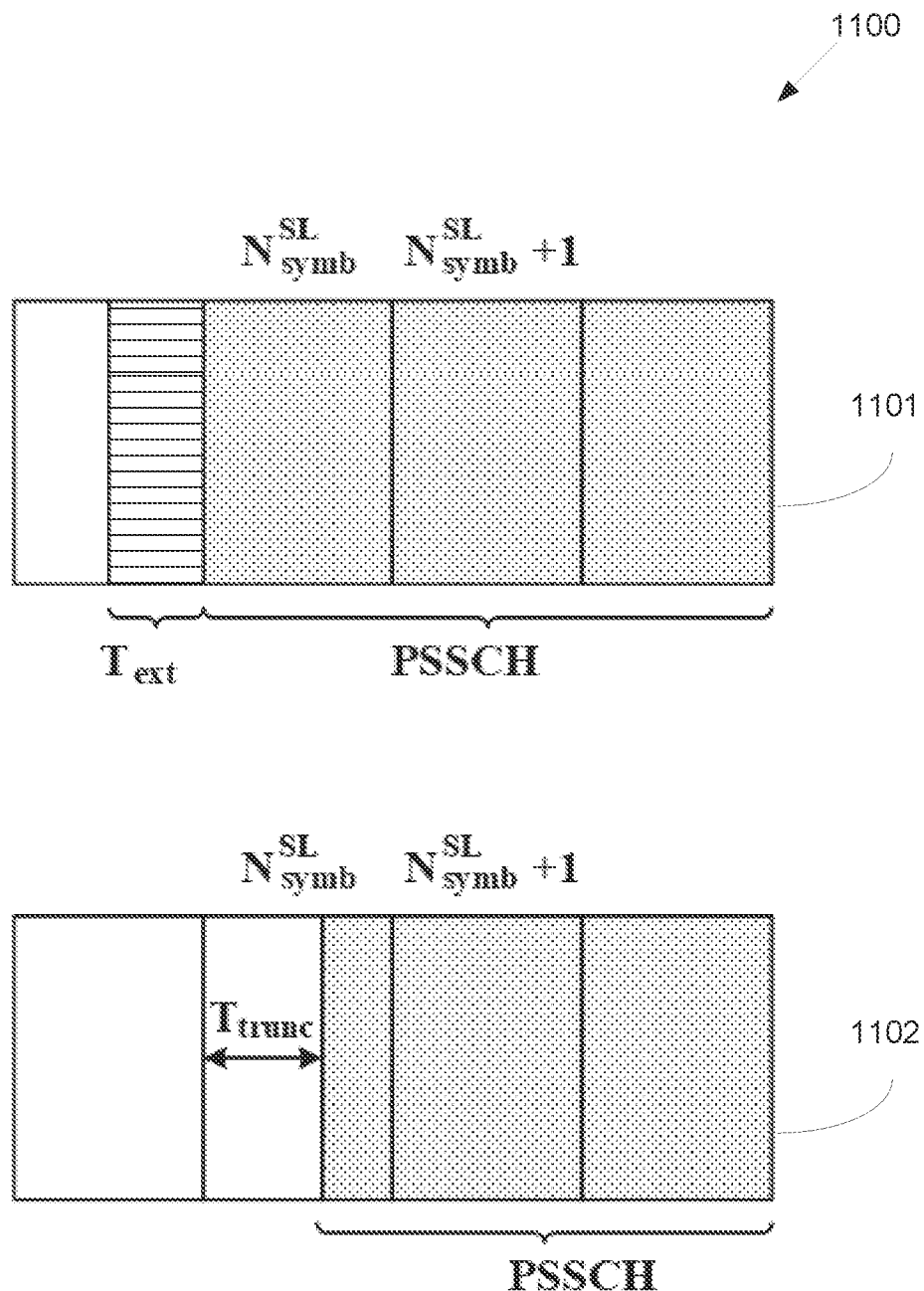
FIG. 11 illustrates an example of PSSCH resource allocation starting from first symbol of SL symbols according to embodiments of the present disclosure.

FIG. 11 illustrates an example of PSSCH resource allocation starting from first symbol of SL symbols 1100 according to embodiments of the present disclosure. An embodiment of the PSSCH resource allocation starting from first symbol of SL symbols 1100 shown in FIG. 11 is for illustration only.

In one instance, the symbol $N_{symb}^{SL}$ can be applied with CP extension with a duration of $T_{ext}$, wherein $T_{ext} \geq 0$ (and $T_{ext}=0$ refers to no CP extension). An example of this instance is shown in 1101 of FIG. 11.

In another instance, the symbol $N_{symb}^{SL}$ can be applied with a symbol truncation from the starting of the symbol with a duration of $T_{trunc}$, wherein $T_{trunc} \geq 0$ (and $T_{trunc}=0$ refers to no truncation). In one instance, $T_{trunc}$ can be with a maximum value, e.g., such that the remaining duration of the symbol can be corrected received, wherein the maximum value can be fixed in the specification, pre-configured, or configured by higher layer parameter. An example of this instance is shown in 1102 of FIG. 11.

In yet another example, the resource allocation for PSSCH can start at symbol $N_{symb}^{SL}+2$, wherein $N_{symb}^{SL}$ is the starting symbol for SL transmission, e.g., according to at least an example in the present disclosure.

In one example, the symbol $N_{symb}^{SL}+1$ can be used for a wake-up-signal (WUS), wherein the WUS can be mapped to the symbol with full bandwidth or partial of the bandwidth. For one sub-example, the WUS can be a sequence based signal, and a UE can detect its existence from correlation detection. For another sub-example, the WUS can be a message based channel (e.g., PSCCH), and a UE can detect its existence and the message from channel decoding.

In another example, the symbol $N_{symb}^{SL}$ can be duplicated of symbol $N_{symb}^{SL}+1$.

Figure 12:
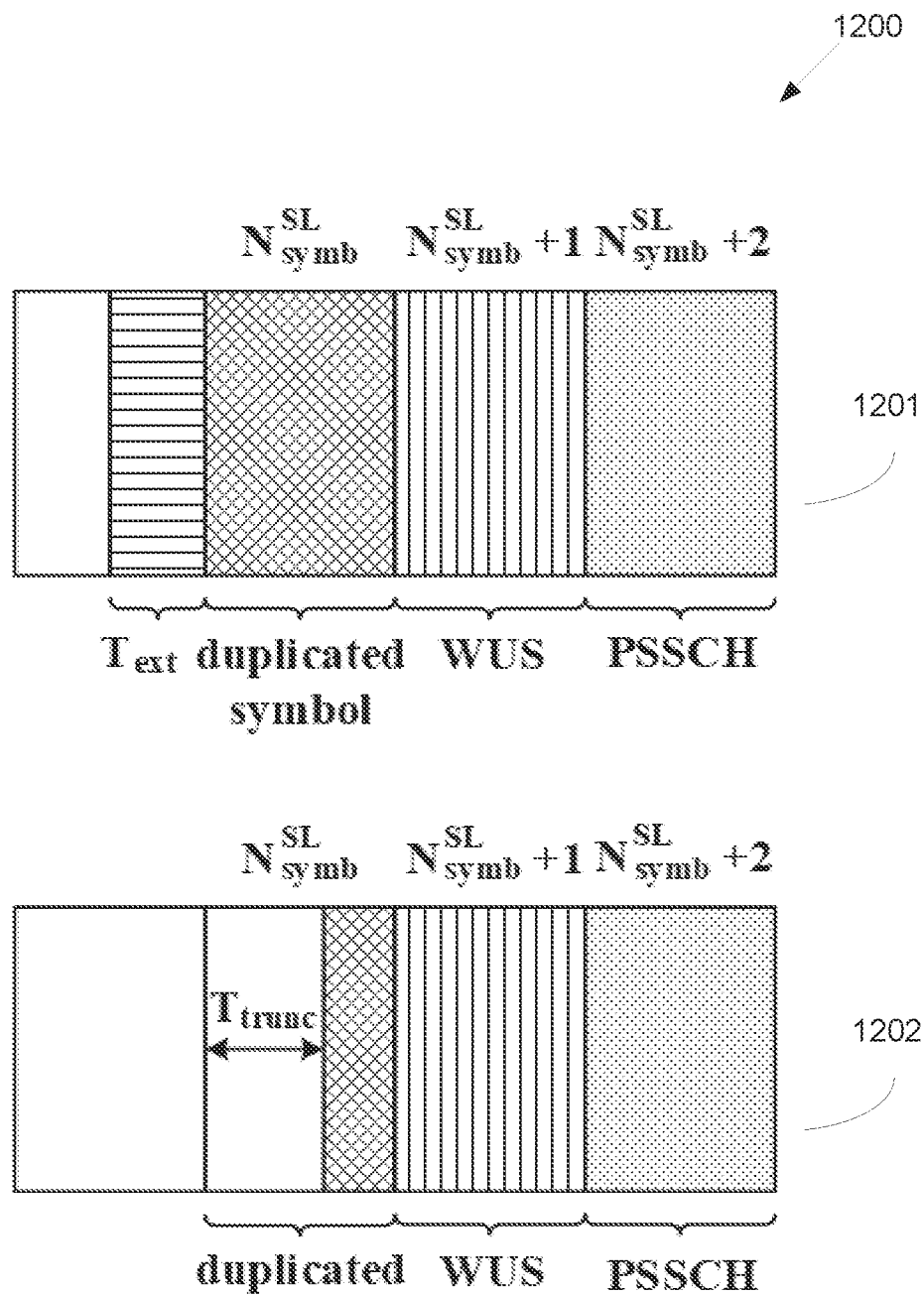
FIG. 12 illustrates an example of PSSCH resource allocation starting from third symbol of SL symbols according to embodiments of the present disclosure.

FIG. 12 illustrates an example of PSSCH resource allocation starting from third symbol of SL symbols 1200 according to embodiments of the present disclosure. An embodiment of the PSSCH resource allocation starting from third symbol of SL symbols 1200 shown in FIG. 12 is for illustration only.

In one instance, the symbol $N_{symb}^{SL}$ can be applied with CP extension with a duration of $T_{ext}$, wherein $T_{ext} \geq 0$ (and $T_{ext}=0$ refers to no CP extension). An example of this instance is shown in 1201 of FIG. 12.

In another instance, the symbol $N_{symb}^{SL}$ can be applied with a symbol truncation from the starting of the symbol with a duration of $T_{trunc}$, wherein $T_{trunc} \geq 0$ (and $T_{trunc}=0$ refers to no truncation) An example of this instance is shown in 1201 of FIG. 12.

In one approach, the resource allocation of PSSCH can start at symbol $N_{symb}^{SL}$ or $N_{symb}^{SL}+1$, based on a pre-configuration and/or a configuration from higher layer parameter and/or an indication by MAC CE. At least one of the examples corresponding to starting symbol at $N_{symb}^{SL}$ or $N_{symb}^{SL}+1$ in this disclosure can be supported, and there can be a pre-configuration and/or a higher layer parameter and/or a MAC CE to configure one of the examples for a UE.

The examples can be from the set or a subset of 1101 to 1102 in FIG. 11 or 1001 to 1004 in FIG. 10, for starting symbol at $N_{symb}^{SL}$ or $N_{symb}^{SL}+1$, respectively. As one variant to this approach, one of the symbol as the starting symbol for PSSCH resource allocation can be determined as default (e.g., fixed in the specification), and at least one of the other symbol as the starting symbol for PSSCH resource allocation can be based on a pre-configuration and/or a configuration from higher layer and/or MAC CE.

For one instance, there can be a pre-configuration and/or a higher layer parameter and/or MAC CE to configure one from example 1001 in FIGS. 10 and 1101 in FIG. 11.

For another instance, there can be a pre-configuration and/or a higher layer parameter and/or MAC CE to configure one from example 1002 in FIGS. 10 and 1102 in FIG. 11.

In another approach, the resource allocation of PSSCH can start at symbol $N_{symb}^{SL}+1$ or $N_{symb}^{SL}+2$, based on a pre-configuration and/or a configuration from higher layer parameter and/or an indication by MAC CE. At least one of the examples corresponding to starting symbol at $N_{symb}^{SL}+1$ or $N_{symb}^{SL}+2$ in this disclosure can be supported, and there can be a pre-configuration and/or a higher layer parameter and/or a MAC CE to configure one of the examples for a UE.

The examples can be from the set or a subset of 1001 to 1004 in FIG. 10, or 1201 to 1202 in FIG. 12, for starting symbol at $N_{symb}^{SL}+1$ or $N_{symb}^{SL}+2$, respectively. As one variant to this approach, one of the symbol as the starting symbol for PSSCH resource allocation can be determined as default (e.g., fixed in the specification), and at least one of the other symbol as the starting symbol for PSSCH resource allocation can be based on a pre-configuration and/or a configuration from higher layer and/or a MAC CE.

For one instance, there can be a pre-configuration and/or a higher layer parameter to configure one from example 1003 in FIGS. 10 and 1201 in FIG. 12.

For another instance, there can be a pre-configuration and/or a higher layer parameter to configure one from example 1004 in FIGS. 10 and 1204 in FIG. 12.

In yet another approach, the resource allocation of PSSCH can start at symbol $N_{symb}^{SL}$, $N_{symb}^{SL}+1$, or $N_{symb}^{SL}+2$, based on a pre-configuration and/or a configuration from higher layer parameter and/or an indication by MAC CE. At least one of the examples corresponding to starting symbol at $N_{symb}^{SL}$, $N_{symb}^{SL}+1$, or $N_{symb}^{SL}+2$ in this disclosure can be supported, and there can be a pre-configuration and/or a higher layer parameter and/or a MAC CE to configure one of the examples for a UE.

The examples can be from the set or a subset of 1101 to 1102 in FIG. 11, or 1001 to 1004 in FIG. 10, or 1201 to 1202 in FIG. 12, for starting symbol at $N_{symb}^{SL}$, $N_{symb}^{SL}+1$, or $N_{symb}^{SL}+2$, respectively. As one variant to this approach, one of the symbol as the starting symbol for PSSCH resource allocation can be determined as default (e.g., fixed in the specification), and at least one of the other symbols as the starting symbol for PSSCH resource allocation can be based on a pre-configuration and/or a configuration from higher layer and/or a MAC CE.

In one approach, the resource allocation of PSSCH can start at symbol $N_{symb}^{SL}$ or $N_{symb}^{SL}+1$, based on the duration of CP extension applied to the first symbol for SL transmission. For example, when the duration of CP extension $T_{ext} \geq T_{TH}$ (or $T_{ext} > T_{TH}$), the resource allocation of PSSCH can start at symbol $N_{symb}^{SL}$, and when the duration of CP extension $T_{ext} < T_{TH}$ (or $T_{ext} \leq T_{TH}$), the resource allocation of PSSCH can start at symbol $N_{symb}^{SL}+1$. In this approach, the threshold $T_{TH}$ can be determined based on the minimum required time duration to perform AGC operation.

For one instance, when the duration of CP extension $T_{ext} \geq T_{TH}$ (or $T_{ext} > T_{TH}$), example 1101 in FIG. 11 can be used by a UE for PSSCH resource allocation; when the duration of CP extension $T_{ext} < T_{TH}$ (or $T_{ext} \leq T_{TH}$), example 1001 in FIG. 10 can be used by a UE for PSSCH resource allocation.

In another approach, the resource allocation of PSSCH can start at symbol $N_{symb}^{SL}$ or $N_{symb}^{SL}+1$, based on the remaining symbol duration after truncation for the first symbol for SL transmission. For example, when the remaining symbol duration $T_{symb,l}^{\mu} - T_{trunc} \geq T_{TH}$ (or $T_{symb,l}^{\mu} - T_{trunc} > T_{TH}$), the resource allocation of PSSCH can start at symbol $N_{symb}^{SL}$, and when the remaining symbol duration $T_{symb,l}^{\mu} - T_{trunc} < T_{TH}$ (or $T_{symb,l}^{\mu} - T_{trunc} \leq T_{TH}$), the resource allocation of PSSCH can start at symbol $N_{symb}^{SL}+1$, wherein $T_{symb,l}^{\mu}$ is the symbol duration before performing truncation. In this approach, the threshold $T_{TH}$ can be determined based on the minimum required time duration to perform AGC operation.

For one instance, when the remaining symbol duration $T_{symb,l}^{\mu} - T_{trunc} \geq T_{TH}$ (or $T_{symb,l}^{\mu} - T_{trunc} > T_T H$), example 1102 in FIG. 11 can be used by a UE for PSSCH resource allocation; when the remaining symbol duration $T_{symb,l}^{\mu} - T_{trunc} < T_{TH}$ (or $T_{symb,l}^{\mu} - T_{trunc} \leq T_{TH}$), example 1002 in FIG. 10 can be used by a UE for PSSCH resource allocation.

In yet another approach, the resource allocation of PSSCH can start at symbol $N_{symb}^{SL}+1$ or $N_{symb}^{SL}+2$, based on the duration of CP extension applied to the first symbol for SL transmission. For example, when the duration of CP extension $T_{ext} \geq T_{TH}$ (or $T_{ext} > T_{TH}$), the resource allocation of PSSCH can start at symbol $N_{symb}^{SL}+1$, and when the duration of CP extension $T_{ext} < T_{TH}$ (or $T_{ext} \leq T_{TH}$), the resource allocation of PSSCH can start at symbol $N_{symb}^{SL}+2$. In this approach, the threshold $T_{TH}$ can be determined based on the minimum required time duration to perform AGC operation.

For one instance, when the duration of CP extension $T_{ext} \geq T_{TH}$ (or $T_{ext} > T_{TH}$), example 1003 in FIG. 10 can be used by a UE for PSSCH resource allocation; when the duration of CP extension $T_{ext} < T_{TH}$ (or $T_{ext} \leq T_{TH}$), example 1201 in FIG. 12 can be used by a UE for PSSCH resource allocation.

In yet another approach, the resource allocation of PSSCH can start at symbol $N_{symb}^{SL}+1$ or $N_{symb}^{SL}+2$, based on the remaining symbol duration after truncation for the first symbol for SL transmission. For example, when the remaining symbol duration $T_{symb,l}^{\mu} - T_{trunc} \geq T_{TH}$ (or $T_{symb,l}^{\mu} - T_{trunc} > T_{TH}$), the resource allocation of PSSCH can start at symbol $N_{symb}^{SL}+1$, and when the remaining symbol duration $T_{symb,l}^{\mu} - T_{trunc} < T_{TH}$ (or $T_{symb,l}^{\mu} - T_{trunc} \leq T_{TH}$), the resource allocation of PSSCH can start at symbol $N_{symb}^{SL}+2$, wherein $T_{symb,l}^{\mu}$ is the symbol duration before performing truncation. In this approach, the threshold $T_{TH}$ can be determined based on the minimum required time duration to perform AGC operation.

For one instance, when the remaining symbol duration $T_{symb,l}^{\mu} - T_{trunc} \geq T_{TH}$ (or $T_{symb,l}^{\mu} - T_{trunc} > T_{TH}$), example 1004 in FIG. 10 can be used by a UE for PSSCH resource allocation; when the remaining symbol duration $T_{symb,l}^{\mu} - T_{trunc} < T_{TH}$ (or $T_{symb,l}^{\mu} - T_{trunc} \leq T_{TH}$), example 1202 in FIG. 12 can be used by a UE for PSSCH resource allocation.

In one embodiment, the starting symbol for PSCCH resource allocation can be based on the starting symbol for SL transmission, wherein the starting symbol for SL transmission is flexible according to at least an example in this disclosure.

In one example, the resource allocation for PSCCH can start based on a fixed relationship with the starting symbol for SL transmission (e.g., $N_{symb}^{SL}$).

Figure 13:
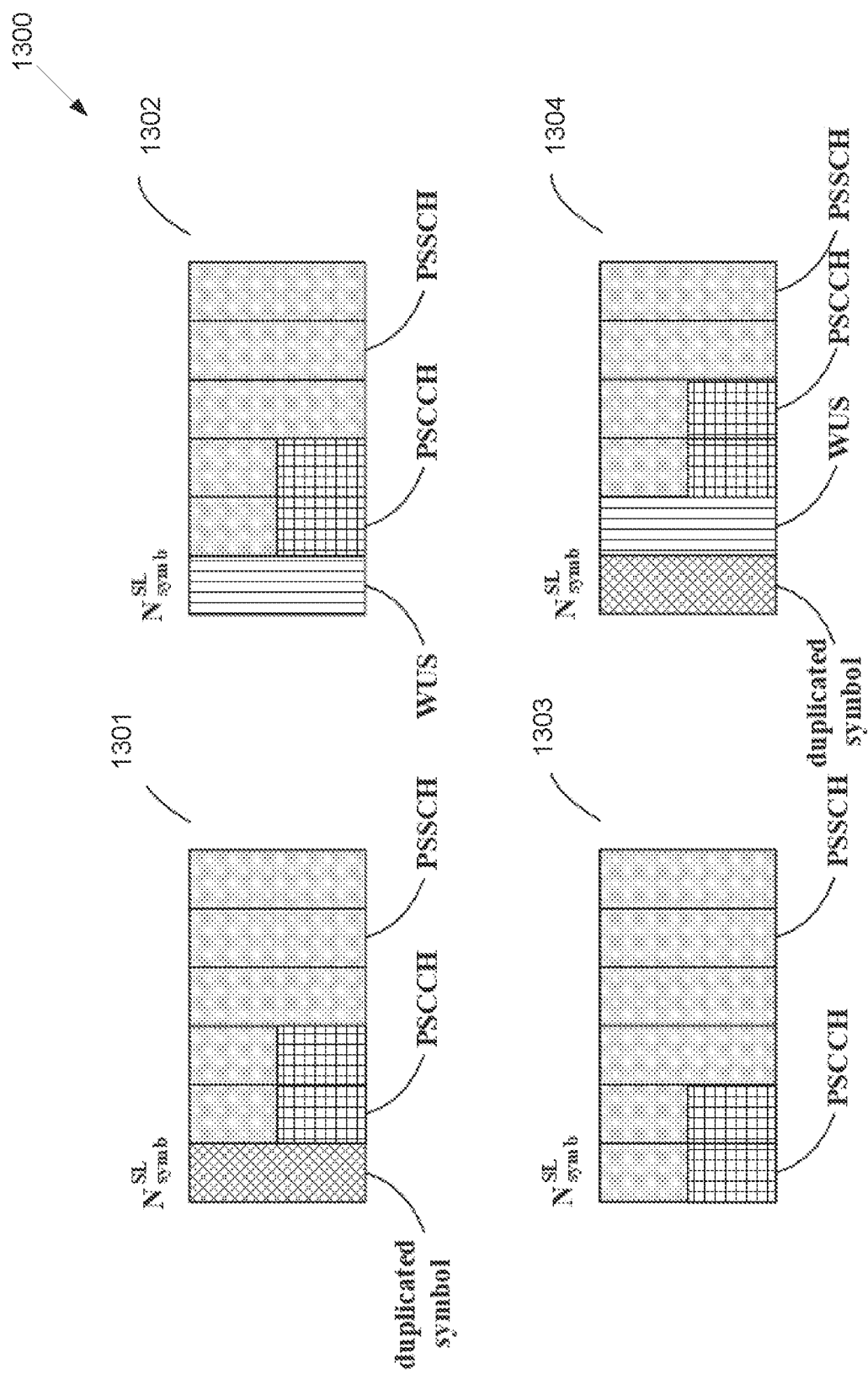
FIG. 13 illustrates an example of PSCCH resource allocation based on starting symbol of SL transmission according to embodiments of the present disclosure.

FIG. 13 illustrates an example of PSCCH resource allocation based on starting symbol of SL transmission 1300 according to embodiments of the present disclosure. An embodiment of the PSCCH resource allocation based on starting symbol of SL transmission 1300 shown in FIG. 13 is for illustration only.

For one sub-example, the resource allocation for PSCCH can start at symbol $N_{symb}^{SL}+1$, wherein $N_{symb}^{SL}$ is the starting symbol for SL transmission, e.g., according to at least an example in this disclosure. Illustration of this example is shown as 1301 or 1302 of FIG. 13, wherein potential CP extension or symbol truncation for symbol $N_{symb}^{SL}$ is not illustrated, and the multiplexing of PSSCH and PSCCH in frequency domain is only for illustration purpose (can be FDMed or IFDMed based on interlaces).

In one example (e.g., shown in 1301 of FIG. 13), the symbol $N_{symb}^{SL}$ can be duplicated of symbol $N_{symb}^{SL}+1$.

In another example (e.g., shown in 1302 of FIG. 13), the symbol $N_{symb}^{SL}$ can be used for a wake-up-signal (WUS), wherein the WUS can be mapped to the symbol with full bandwidth or partial of the bandwidth.

For another sub-example, the resource allocation for PSCCH can start at symbol $N_{symb}^{SL}$, wherein $N_{symb}^{SL}$ is the starting symbol for SL transmission, e.g., according to at least an example in this disclosure. Illustration of this example is shown as 1303 of FIG. 13, wherein potential CP extension or symbol truncation for symbol $N_{symb}^{SL}$ is not illustrated, and the multiplexing of PSSCH and PSCCH in frequency domain is only for illustration purpose (can be FDMed or IFDMed based on interlaces).

For yet another sub-example, the resource allocation for PSCCH can start at symbol $N_{symb}^{SL}+2$, wherein $N_{symb}^{SL}$ is the starting symbol for SL transmission, e.g., according to at least an example in this disclosure. Illustration of this example is shown as 1304 of FIG. 13, wherein potential CP extension or symbol truncation for symbol $N_{symb}^{SL}$ is not illustrated, and the multiplexing of PSSCH and PSCCH in frequency domain is only for illustration purpose (can be FDMed or IFDMed based on interlaces).

In one example, the symbol $N_{symb}^{SL}$ can be used for a wake-up-signal (WUS), wherein the WUS can be mapped to the symbol with full bandwidth or partial of the bandwidth.

In another example, the symbol $N_{symb}^{SL}$ can be duplicated of symbol $N_{symb}^{SL}+1$.

In another example, the resource allocation for PSCCH can start based on a fixed relationship with the last symbol for SL transmission (e.g., denoted as $N_{symb,end}^{SL}$). In one instance, the last symbol for SL transmission can be determined as startSLsymbol+lengthSLsymbols−1. In another instance, the last symbol for SL transmission can be fixed as symbol 13.

Figure 14:
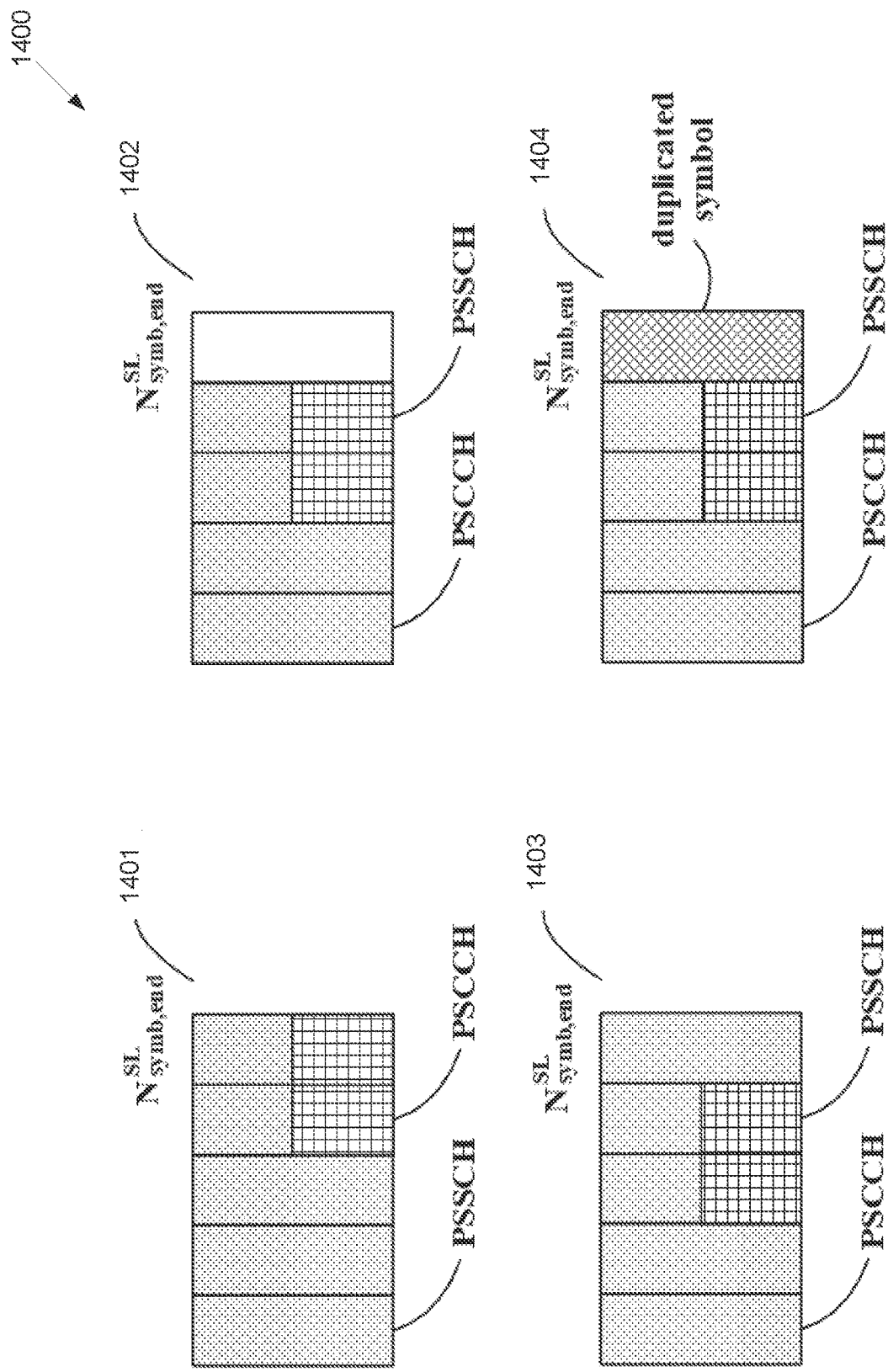
FIG. 14 illustrates an example of PSCCH resource allocation based on last symbol of SL transmission according to embodiments of the present disclosure.

FIG. 14 illustrates an example of PSCCH resource allocation based on last symbol of SL transmission 1400 according to embodiments of the present disclosure. An embodiment of the PSCCH resource allocation based on last symbol of SL transmission 1400 shown in FIG. 14 is for illustration only.

For one sub-example, the resource allocation for PSCCH can end at symbol $N_{symb,end}^{SL}$, e.g., according to at least an example in this disclosure. Illustration of this example is shown as 1401 of FIG. 14, wherein the multiplexing of PSSCH and PSCCH in frequency domain is only for illustration purpose (can be FDMed or IFDMed based on interlaces).

For another sub-example, the resource allocation for PSCCH can end at symbol $N_{symb,end}^{SL}-1$, e.g., according to at least an example in this disclosure. Illustration of this example is shown as 1402, 1403, or 1404 of FIG. 14, wherein the multiplexing of PSSCH and PSCCH in frequency domain is only for illustration purpose (can be FDMed or IFDMed based on interlaces).

In one example, the symbol $N_{symb,end}^{SL}$ can be left as empty (e.g., 1402 of FIG. 14).

In another example, the symbol $N_{symb,end}^{SL}$ can be also utilized for resource allocation of PSSCH (e.g., 1403 of FIG. 14).

In yet another example, the symbol $N_{symb,end}^{SL}$ can be duplicated of symbol $N_{symb,end}^{SL}-1$ (e.g., 1404 of FIG. 14).

In yet another example, the resource allocation for PSCCH can start based on a fixed relationship with the last starting symbol for SL transmission within the set of starting symbol locations in a slot (e.g., $N_{symb,last}^{SL}$, which can be the maximum value of the starting symbol locations in a slot).

For one sub-example, the resource allocation for PSCCH can start at symbol $N_{symb,last}^{SL}+1$, wherein $N_{symb,last}^{SL}$ is the last starting symbol for SL transmission within the set of starting symbol locations in a slot.

In one example, the symbol $N_{symb,last}^{SL}$ can be duplicated of symbol $N_{symb,last}^{SL}+1$.

In another example, the symbol $N_{symb,last}^{SL}$ can be used for a wake-up-signal (WUS), wherein the WUS can be mapped to the symbol with full bandwidth or partial of the bandwidth.

For another sub-example, the resource allocation for PSCCH can start at symbol $N_{symb,last}^{SL}$, wherein $N_{symb,last}^{SL}$ is the last starting symbol for SL transmission within the set of starting symbol locations in a slot.

For yet another sub-example, the resource allocation for PSCCH can start at symbol $N_{symb,last}^{SL}+2$, wherein $N_{symb,last}^{SL}$ is the last starting symbol for SL transmission within the set of starting symbol locations in a slot.

In one example, the symbol $N_{symb,last}^{SL}$ can be used for a wake-up-signal (WUS), wherein the WUS can be mapped to the symbol with full bandwidth or partial of the bandwidth.

In another example, the symbol $N_{symb,last}^{SL}$ can be duplicated of symbol $N_{symb,last}^{SL}+1$.

In yet another example, the resource allocation for PSCCH can start from any symbol available for SL transmission, e.g., no fixed relationship with the starting symbol or last symbol for SL transmission.

Figure 15:
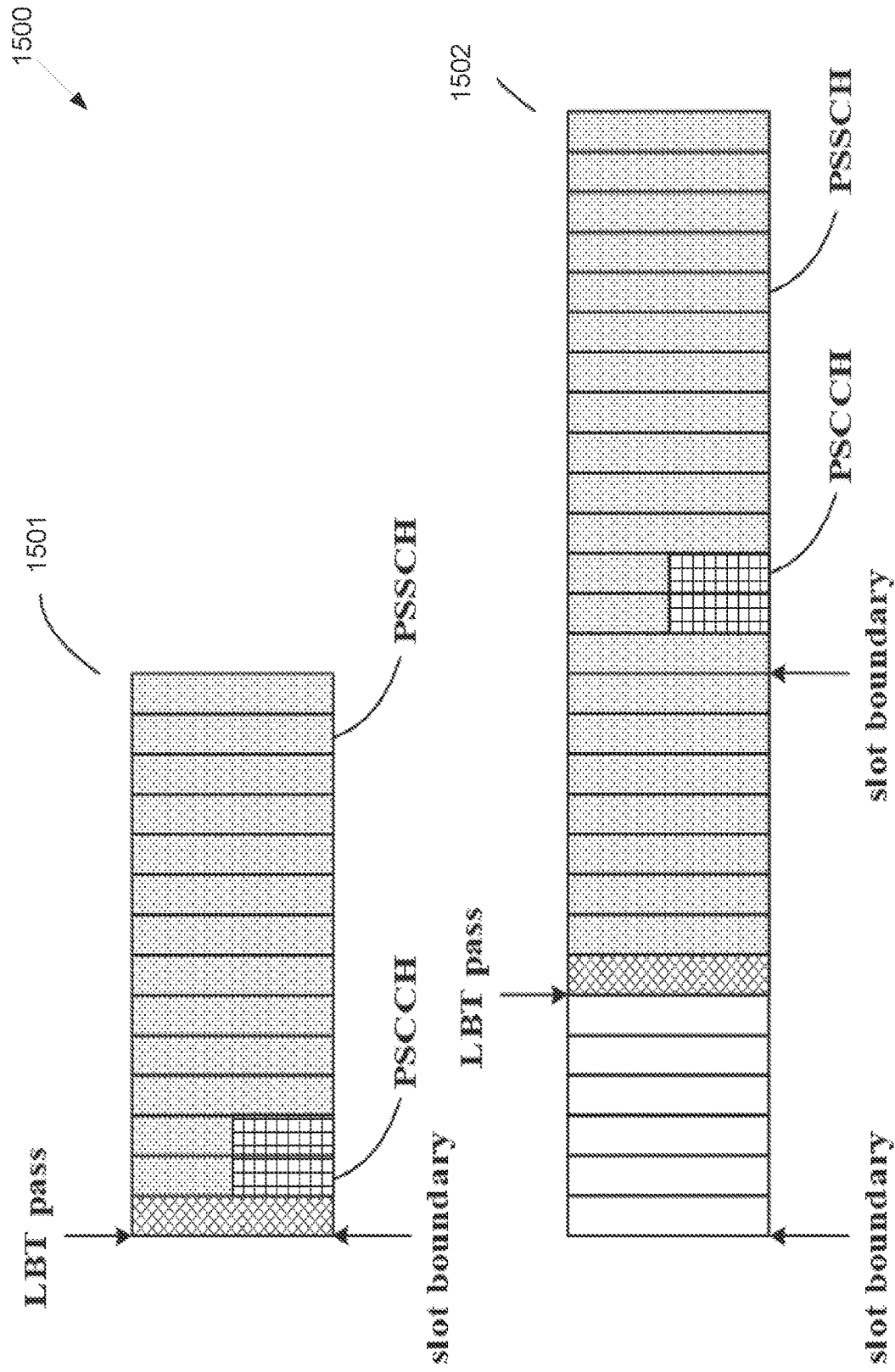
FIG. 15 illustrates an example of PSCCH resource allocation according to LBT according to embodiments of the present disclosure.

FIG. 15 illustrates an example of PSCCH resource allocation according to LBT 1500 according to embodiments of the present disclosure. An embodiment of the PSCCH resource allocation according to LBT 1500 shown in FIG. 15 is for illustration only.

In yet another example, the resource allocation for PSCCH can be absent in a first slot of a consecutive number of slots for SL transmission. For instance, the absence of PSCCH in a slot can be according to the timing that channel access procedure (e.g., listen-before-talk procedure) completes and SL transmission starts. In one sub-example, if the channel access procedure completes and SL transmission starts earlier than the intended location for transmitting PSCCH in a slot (e.g., 1501 in FIG. 15), the PSCCH can be transmitted at the intended location in the slot; if the channel access procedure completes and SL transmission starts later than the intended location for transmitting PSCCH in a slot (e.g., 1502 in FIG. 15), the PSCCH can be absent in current slot, and transmitted in the next intended location (e.g., in the next slot).

In one example, the transmission of PSCCH in the next intended location can be subject to the remaining number of symbols for SL transmission in current slot after the channel access procedure completes, e.g., there can be a lower bound on the number of symbols for SL transmission $N_{symb,min}^{SL}$, wherein $N_{symb,min}^{SL}$ can be fixed in the specification, pre-configured, and/or configured by higher layer parameter.

In another example, the transmission of PSCCH in the next intended location can be subject to the presence of a gap between current slot and the slot including the next intended location for transmitting PSCCH, e.g., only when there is no gap between current slot and the slot including the next intended location for transmitting PSCCH, the PSCCH can be transmitted in the next intended location.

In yet another example, the resource allocation for PSCCH can start according to one from multiple examples of this disclosure, based on a pre-configuration and/or a configuration from higher layer parameter and/or a MAC CE. As one variant to this example, one of the symbol as the starting symbol for PSCCH resource allocation can be determined as default (e.g., fixed in the specification), and at least one of the other symbol as the starting symbol for PSCCH resource allocation can be based on a pre-configuration and/or a configuration from higher layer and/or a MAC CE.

In one example, the resource allocation for PSCCH can start at symbol $N_{symb}^{SL}+1$ (1301 or 1302 of FIG. 13) or $N_{symb}^{SL}+2$ (1304 of FIG. 13), based on a pre-configuration and/or a configuration from higher layer and/or a MAC CE.

For another example, the resource allocation for PSCCH can start at symbol $N_{symb}^{SL}$ (1303 of FIG. 13) or $N_{symb}^{SL}+1$ (1301 or 1302 of FIG. 13), based on a pre-configuration and/or a configuration from higher layer and/or a MAC CE.

For yet another sub-example, the resource allocation for PSCCH can start at symbol $N_{symb,end}^{SL}-1$ (1402, 1403, or 1404 of FIG. 14) or $N_{symb,end}^{SL}$ (1401 of FIG. 14), based on a pre-configuration and/or a configuration from higher layer and/or a MAC CE.

In yet another example, the resource allocation for PSCCH can start according to one from multiple examples of this disclosure, based on UE capability.

In yet another example, the resource allocation of PSCCH can start at symbol $N_{symb}^{SL}$ or $N_{symb}^{SL}+1$, based on the duration of CP extension applied to the first symbol for SL transmission. For instance, when the duration of CP extension $T_{ext} \geq T_{TH}$ (or $T_{ext} > T_{TH}$), the resource allocation of PSCCH can start at symbol $N_{symb}^{SL}$ (1403 of FIG. 14), and when the duration of CP extension $T_{ext} < T_{TH}$ (or $T_{ext} \leq T_{TH}$), the resource allocation of PSCCH can start at symbol $N_{symb}^{SL}+1$ (1301 or 1302 of FIG. 13). In this instance, the threshold $T_{TH}$ can be determined based on the minimum required time duration to perform AGC operation.

In yet another example, the resource allocation of PSCCH can start at symbol $N_{symb}^{SL}$ or $N_{symb}^{SL}+1$, based on the remaining symbol duration after truncation for the first symbol for SL transmission. For instance, when the remaining symbol duration $T_{symb,l}^{\mu}-T_{trunc} \geq T_{TH}$ (or $T_{symb,l}^{\mu}-T_{trunc}>T_{TH}$), the resource allocation of PSCCH can start at symbol $N_{symb}^{SL}$ (1303 of FIG. 13), and when the remaining symbol duration $T_{symb,l}^{\mu}-T_{trunc}<T_{TH}$ (or $T_{symb,l}^{\mu}-T_{trunc} \leq T_{TH}$), the resource allocation of PSSCH can start at symbol $N_{symb}^{SL}+1$ (1301 or 1302 of FIG. 13), wherein $T_{symb,l}^{\mu}$ is the symbol duration before performing truncation. In this instance, the threshold $T_{TH}$ can be determined based on the minimum required time duration to perform AGC operation.

In yet another example, the resource allocation of PSCCH can start at symbol $N_{symb}^{SL}+1$ or $N_{symb}^{SL}+2$, based on the duration of CP extension applied to the first symbol for SL transmission. For instance, when the duration of CP extension $T_{ext} \geq T_{TH}$ (or $T_{ext}>T_{TH}$), the resource allocation of PSSCH can start at symbol $N_{symb}^{SL}+1$ (1301 or 1302 of FIG. 13), and when the duration of CP extension $T_{ext}<T_{TH}$ (or $T_{ext} \leq T_{TH}$), the resource allocation of PSCCH can start at symbol $N_{symb}^{SL}+2$ (1304 of FIG. 13). In this instance, the threshold $T_{TH}$ can be determined based on the minimum required time duration to perform AGC operation.

In yet another example, the resource allocation of PSCCH can start at symbol $N_{symb}^{SL}+1$ or $N_{symb}^{SL}+2$, based on the remaining symbol duration after truncation for the first symbol for SL transmission. For instance, when the remaining symbol duration $T_{symb,l}^{\mu}-T_{trunc} \geq T_{TH}$ (or $T_{symb,l}^{\mu}-T_{trunc}>T_{TH}$), the resource allocation of PSCCH can start at symbol $N_{symb}^{SL}+1$ (1301 or 1302 of FIG. 13), and when the remaining symbol duration $T_{symb,l}^{\mu}-T_{trunc}<T_{TH}$ (or $T_{symb,l}^{\mu}-T_{trunc} \leq T_{TH}$), the resource allocation of PSSCH can start at symbol $N_{symb}^{SL}+2$ (1304 of FIG. 13), wherein $T_{symb,l}^{\mu}$ is the symbol duration before performing truncation. In this instance, the threshold $T_{TH}$ can be determined based on the minimum required time duration to perform AGC operation.

In one example, there can be multiple candidate time domain resources in a slot for transmitting a PSCCH (e.g., corresponding to multiple starting locations), and a transmitter may choose one from the candidate resources to transmit (e.g., according to channel access procedure for operation with shared spectrum channel access) and a receiver may need to blind detect the candidate resources to receive a PSCCH. In one instance, the UE may assume PSCCH is transmitted only at most one of the candidate resources.

In one embodiment, an indication of PSSCH resource allocation can be supported in sidelink control information (SCI). For this embodiment the PSSCH resource allocation can include symbol level information on PSSCH resource allocation, and a UE can determine a starting symbol and/or an ending symbol for PSSCH resource allocation based on the indication in SCI. For one instance, the SCI is carried by a PSCCH, e.g., the SCI is with format 1-A. For another instance, the SCI is carried by a PSSCH, e.g., the SCI is with format 2-A or 2-B. For yet another instance, the SCI is a new format (e.g., other than SCI format 1-A, 2-A, or 2-B).

For one example, there can be an indication of whether the last symbol for SL transmission can be used for PSSCH resource allocation (e.g., rate matching for PSSCH) in the SCI. For one instance, a field in the SCI taking value of 1 indicates the last symbol for SL transmission in the same slot is utilized for PSSCH resource allocation, and the field in the SCI taking value of 0 indicates the last symbol for SL transmission in the same slot is not utilized for PSSCH resource allocation. For another instance, a field in the SCI taking value of 0 indicates the last symbol for SL transmission in the same slot is utilized for PSSCH resource allocation, and the field in the SCI taking value of 1 indicates the last symbol for SL transmission in the same slot is not utilized for PSSCH resource allocation.

For another example, there can be an indication of the index of the last symbol for PSSCH resource allocation in the SCI.

For yet another example, there can be an indication of the index of the starting symbol for PSSCH resource allocation in the SCI.

For yet another example, there can be an indication of the number of symbols for PSSCH resource allocation in the SCI.

For yet another example, there can be an indication of the index(es) of the starting symbol and last symbol for PSSCH resource allocation. For one sub-example, there can be a field in the SCI to jointly code the index of the starting symbol and the index of the last symbol for PSSCH resource allocation, e.g., using a RIV. For another sub-example, there can be a field in the SCI to indicate an index of a row in a table, wherein the row in the table includes the index of the starting symbol and the index of the last symbol for PSSCH resource allocation.

For yet another example, there can be an indication of the index(es) of the starting symbol and the number of symbols for PSSCH resource allocation. For one sub-example, there can be a field in the SCI to jointly code the index of the starting symbol and the number of symbols for PSSCH resource allocation, e.g., using a RIV. For another sub-example, there can be a field in the SCI to indicate an index of a row in a table, wherein the row in the table includes the index of the starting symbol and the number of symbols for PSSCH resource allocation.

For one example, the starting symbol of PSSCH resource allocation can be in the previous slot comparing to the slot including the SCI, e.g., the resource allocation for PSSCH can start from a previous slot.

For another example, the starting symbol and end symbol of PSSCH resource allocation can be in different slots, e.g., the resource allocation for PSSCH can across slot boundary.

For yet another example, the number of symbols for PSSCH resource allocation can be exceed the remaining number of symbols in the slot for SL transmission, e.g., the resource allocation for PSSCH can across slot boundary.

In one embodiment, for the SL transmission (e.g., PSSCH transmission with its associated PSCCH, DM-RS and AGC symbol) that can be from multiple starting symbols in a slot, its processing time can have an extra term on top of the processing time corresponding to a single starting symbol in the slot.

For one example, for the transmission of PSSCH (e.g., with its associated PSCCH, DM-RS and AGC symbol), the processing time can be given by $T\_proc'=T\_proc+\Delta T\_proc$, wherein $T\_proc$ is the processing time corresponding to a single starting symbol in the slot, and $\Delta T\_proc$ is the extra processing time for multiple starting symbols in the slot comparing to the single start symbol in the slot.

For one sub-example, $\Delta T\_proc$ can be determined as a number of symbols, e.g., wherein the number of symbols can be based on the SCS.

In another embodiment, for the PUCCH or PUSCH transmission to report HARQ information, if the corresponding PSFCH, from which the HARQ information is generated, is associated with PSSCH that can be from multiple starting symbols in a slot, its preparation time can have an extra term on top of the preparation time corresponding to a single starting symbol in the slot.

For one example, for the transmission of PUCCH or PUSCH to report HARQ information, the preparation time can be given by T_prep'=T_prep+ΔT_prep, wherein T_prep is the preparation time corresponding to a single starting symbol in the slot, and ΔT_prep is the extra preparation time for multiple starting symbols in the slot comparing to the single start symbol in the slot.

For one sub-example, ΔT_prep can be determined as a number of symbols, e.g., wherein the number of symbols can be based on the SCS.

In yet another embodiment, for the PUCCH or PUSCH transmission to report HARQ information, if the corresponding PSFCH, from which the HARQ information is generated, can be from multiple starting symbols in a slot, its preparation time can have an extra term on top of the preparation time corresponding to a single starting symbol in the slot.

For one example, for the transmission of PUCCH or PUSCH to report HARQ information, the preparation time can be given by T_prep'=T_prep+ΔT_prep, wherein T_prep is the preparation time corresponding to a single starting symbol in the slot, and ΔT_prep is the extra preparation time for multiple starting symbols in the slot comparing to the single start symbol in the slot.

For one sub-example, ΔT_prep can be determined as a number of symbols, e.g., wherein the number of symbols can be based on the SCS.

Figure 16:
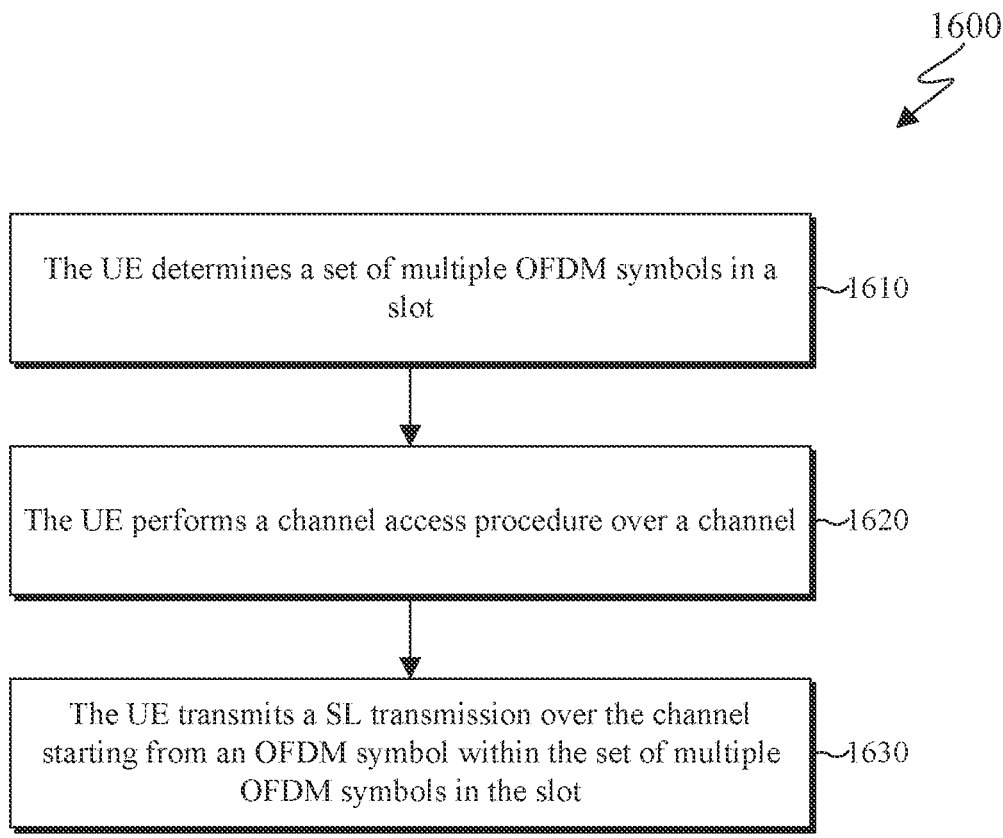
FIG. 16 illustrates a method of operation of a UE in a wireless communication system operating with a shared spectrum channel access.

FIG. 16 illustrates an example method for operation of a UE in a wireless communication system operating with a shared spectrum channel access according to embodiments of the present disclosure. The steps of the method 1600 of FIG. 16 can be performed by any of the UEs 111-116 of FIG. 1, such as the UE 116 of FIG. 3. The method 1600 is for illustration only and other embodiments can be used without departing from the scope of the present disclosure.

The method begins with the UE determining a set of multiple OFDM symbols in a slot (step 1610). For example, in step 1610, the UE determines set of multiple OFDM symbols in the slot based on a higher layer configuration or pre-configurations. The set of multiple OFDM symbols in the slot includes a first OFDM symbol and a second OFDM symbol. In various embodiments, the second OFDM symbol is determined as a first value if the slot includes a PSFCH transmission occasion and determined as a second value if the slot does not include the PSFCH transmission occasion. The UE then performs a channel access procedure over a channel (step 1620).

The UE then transmits a SL transmission over the channel starting from an OFDM symbol within the set of multiple OFDM symbols in the slot (step 1630). For example, in step 1630, the UE performs the SL transmission upon successfully performing the channel access procedure before the OFDM symbol occurs. In some embodiments, the SL transmission starts from one of the first or the second OFDM symbol, when the sidelink transmission is a first transmission in a channel occupancy initiated by the UE. In some embodiments, the SL transmission starts from the first OFDM symbol, when the sidelink transmission is not the first transmission in the channel occupancy initiated by the UE.

In various embodiments, the SL transmission includes a PSSCH or a physical sidelink control channel PSCCH. For example, a starting symbol of the PSSCH in the slot is a next symbol after the first OFDM symbol, when the SL transmission starts from the first OFDM symbol, and the starting symbol of the PSSCH in the slot is a next symbol after the second OFDM symbol, when the SL transmission starts from the second OFDM symbol. In another example, a starting symbol of the PSCCH in the slot is a next symbol after the first OFDM symbol, when the SL transmission starts from the first OFDM symbol, and the starting symbol of the PSCCH in the slot is a next symbol after the second OFDM symbol, when the SL transmission starts from the second OFDM symbol. In some examples, the next symbol after the first OFDM symbol repeats the first OFDM symbol and the next symbol after the second OFDM symbol repeats the second OFDM symbol.

Although FIG. 16 illustrates the method 1600 various changes may be made to FIG. 16. For example, while the method 1600 is shown as a series of steps, various steps could overlap, occur in parallel, occur in a different order, or occur multiple times. In another example, steps may be omitted or replaced by other steps. For example, steps of the method 1600 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system operating with a shared spectrum channel access, the UE comprising:
   a processor configured to:
      determine a set of multiple orthogonal frequency-division multiplexing (OFDM) symbols in a slot; and
      perform a channel access procedure over a channel; and
   a transceiver operably coupled to the processor, the transceiver configured to transmit a sidelink transmission over the channel, starting from an OFDM symbol within the set of multiple OFDM symbols in the slot, upon successfully performing the channel access procedure before the OFDM symbol.

2. The UE of claim 1, wherein the set of multiple OFDM symbols in the slot is determined based on a higher layer configuration or pre-configurations.

3. The UE of claim 1, wherein when the slot does not include a physical sidelink feedback channel (PSFCH) transmission occasion, the set of multiple OFDM symbols in the slot includes a first OFDM symbol and a second OFDM symbol.

4. The UE of claim 3, wherein when the slot includes a physical sidelink feedback channel (PSFCH) transmission occasion, the set of multiple OFDM symbols in the slot includes the first OFDM symbol only.

5. The UE of claim 3, wherein:
when the sidelink transmission is a first transmission in a channel occupancy initiated by the UE, the sidelink transmission starts from one of the first or the second OFDM symbol; and
when the sidelink transmission is not the first transmission in the channel occupancy initiated by the UE, the sidelink transmission starts from the first OFDM symbol.

6. The UE of claim 3, wherein the sidelink transmission includes a physical sidelink shared channel (PSSCH) or a physical sidelink control channel (PSCCH).

7. The UE of claim 6, wherein:
when the sidelink transmission starts from the first OFDM symbol, a starting symbol of the PSSCH in the slot is a next symbol after the first OFDM symbol; and
when the sidelink transmission starts from the second OFDM symbol, the starting symbol of the PSSCH in the slot is a next symbol after the second OFDM symbol.

8. The UE of claim 6, wherein:
when the sidelink transmission starts from the first OFDM symbol, a starting symbol of the PSCCH in the slot is a next symbol after the first OFDM symbol, and
when the sidelink transmission starts from the second OFDM symbol, the starting symbol of the PSCCH in the slot is a next symbol after the second OFDM symbol.

9. The UE of claim 6, wherein:
when the sidelink transmission starts from the first OFDM symbol, a starting symbol of the PSSCH or the PSCCH in the slot is a next symbol after the first OFDM symbol, and
the next symbol after the first OFDM symbol repeats the first OFDM symbol.

10. The UE of claim 6, wherein:
when the sidelink transmission starts from the second OFDM symbol, a starting symbol of the PSSCH or the PSCCH in the slot is a next symbol after the second OFDM symbol, and
the next symbol after the second OFDM symbol repeats the second OFDM symbol.

11. A method of user equipment (UE) in a wireless communication system operating with a shared spectrum channel access, the method comprising:
determining a set of multiple orthogonal frequency-division multiplexing (OFDM) symbols in a slot;
performing a channel access procedure over a channel; and
transmitting a sidelink transmission over the channel, starting from an OFDM symbol within the set of multiple OFDM symbols in the slot, upon successfully performing the channel access procedure before the OFDM symbol.

12. The method of claim 11, wherein the set of multiple OFDM symbols in the slot is determined based on a higher layer configuration or pre-configurations.

13. The method of claim 11, wherein when the slot does not include a physical sidelink feedback channel (PSFCH) transmission occasion, the set of multiple OFDM symbols in the slot includes a first OFDM symbol and a second OFDM symbol.

14. The method of claim 13, wherein when the slot includes the PSFCH transmission occasion, the set of multiple OFDM symbols in the slot includes the first OFDM symbol only.

15. The method of claim 13, wherein:
when the sidelink transmission is a first transmission in a channel occupancy initiated by the UE, the sidelink transmission starts from one of the first or the second OFDM symbol, and
when the sidelink transmission is not the first transmission in the channel occupancy initiated by the UE, the sidelink transmission starts from the first OFDM symbol.

16. The method of claim 13, wherein the sidelink transmission includes a physical sidelink shared channel (PSSCH) or a physical sidelink control channel (PSCCH).

17. The method of claim 16, wherein:
when the sidelink transmission starts from the first OFDM symbol, a starting symbol of the PSSCH in the slot is a next symbol after the first OFDM symbol, and
when the sidelink transmission starts from the second OFDM symbol, the starting symbol of the PSSCH in the slot is a next symbol after the second OFDM symbol.

18. The method of claim 16, wherein:
when the sidelink transmission starts from the first OFDM symbol, a starting symbol of the PSCCH in the slot is a next symbol after the first OFDM symbol, and
when the sidelink transmission starts from the second OFDM symbol, the starting symbol of the PSCCH in the slot is a next symbol after the second OFDM symbol.

19. The method of claim 16, wherein:
when the sidelink transmission starts from the first OFDM symbol, a starting symbol of the PSSCH or the PSCCH in the slot is a next symbol after the first OFDM symbol, and
the next symbol after the first OFDM symbol repeats the first OFDM symbol.

20. The method of claim 16, wherein:
when the sidelink transmission starts from the second OFDM symbol, a starting symbol of the PSSCH or the PSCCH in the slot is a next symbol after the second OFDM symbol, and
the next symbol after the second OFDM symbol repeats the second OFDM symbol.

* * * * *